US012362872B2

United States Patent
Handte et al.

(10) Patent No.: US 12,362,872 B2
(45) Date of Patent: Jul. 15, 2025

(54) COMMUNICATION DEVICES AND METHODS

(71) Applicant: Sony Group Corporation, Tokyo (JP)

(72) Inventors: Thomas Handte, Stuttgart (DE); Dana Ciochina, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 68 days.

(21) Appl. No.: 17/910,357

(22) PCT Filed: Feb. 19, 2021

(86) PCT No.: PCT/EP2021/054129
§ 371 (c)(1),
(2) Date: Sep. 9, 2022

(87) PCT Pub. No.: WO2021/185526
PCT Pub. Date: Sep. 23, 2021

(65) Prior Publication Data
US 2023/0134261 A1    May 4, 2023

(30) Foreign Application Priority Data

Mar. 16, 2020  (EP) .................................... 20163435
Mar. 25, 2020  (EP) .................................... 20165517

(51) Int. Cl.
*H04L 5/00*  (2006.01)
*H04W 72/0453*  (2023.01)

(52) U.S. Cl.
CPC .......... *H04L 5/0007* (2013.01); *H04L 5/0042* (2013.01); *H04L 5/0044* (2013.01); *H04L 5/0094* (2013.01); *H04W 72/0453* (2013.01)

(58) Field of Classification Search
CPC ... H04L 5/0007; H04L 5/0042; H04L 5/0044; H04L 5/0094; H04W 72/0453
See application file for complete search history.

(56) References Cited

U.S. PATENT DOCUMENTS

2018/0248591 A1   8/2018  Geng
2019/0238288 A1   8/2019  Liu et al.
(Continued)

FOREIGN PATENT DOCUMENTS

CN        10464638 A     2/2017
WO    WO-2020007271 A1   1/2020

OTHER PUBLICATIONS

International Search Report and Written Opinion mailed on May 3, 2021, received for PCT Application PCT/EP2021/054129, filed on Feb. 19, 2021, 11 pages.
(Continued)

*Primary Examiner* — Melvin C Marcelo
(74) *Attorney, Agent, or Firm* — XSENSUS LLP

(57) ABSTRACT

In communication devices and methods configured to communicate with each other, bits of a continuous bit stream are allocated to resource units of different sizes. Various options are disclosed that differ in both implementation complexity and diversity achieved. Furthermore, exemplary implementations are provided that consider the definition of resource units of IEEE802.11ax as a baseline and outline the operation of the bit allocation for combination of resource units of various sizes.

16 Claims, 16 Drawing Sheets

(56) References Cited

U.S. PATENT DOCUMENTS

| | | |
|---|---|---|
| 2021/0227510 A1* | 7/2021 | Hu .................. H04L 1/0071 |
| 2021/0281382 A1* | 9/2021 | Hu .................. H04L 5/0005 |
| 2024/0178931 A1* | 5/2024 | Zhang ............... H04L 5/0044 |

OTHER PUBLICATIONS

IEEE, "Draft Standard for Information technology—Telecommunications and information exchange between systems Local and metropolitan area networks—Specific requirements", IEEE Computer Society, IEEE P802.11be/D0.2, Dec. 2020, pp. 1-347.

Edward Au (Huawei), "Compendium of straw polls and potential changes to the Specification Framework Document", IEEE P802.11, Wireless LANs, doc.: IEEE 802.11-20/0566r99, Dec. 6, 2020, 289 pages.

IEEE, "Data and pilot subcarrier indices for RUs in a 40 MHz HE PPDU and in a non-OFDMA 40 MHz HE PPDU", IEEE, P802.11ax/D6.0, Nov. 2019, pp. 508-511.

IEEE, "Draft Standard for Information technology—Telecommunications and information exchange between systems Local and metropolitan area networks—Specific requirements", IEEE Computer Society, IEEE P802.11be/D1.0, May 2021, pp. 1-635.

* cited by examiner

Table 2

| Type | $i=1$ | | $s_1=t_1$ | $i=2$ | | $s_2=t_2$ | $i=3$ | | $s_3=t_3$ | $c_0$ | According to option |
|---|---|---|---|---|---|---|---|---|---|---|---|
| | $p_1$ | | | $p_2$ | | | $p_3$ | | | | |
| 26+52 | $26q_1$ | | 0 | $52q_2$ | | 0 | - | | - | 1 | 1 |
| | $\underbrace{Q_1,\ldots,Q_1}_{26q_1/Q_1},0,\ldots,0$ | | 0 | $\underbrace{Q_2,\ldots,Q_2}_{52q_2/Q_2}$ | | 0 | - | | - | $52\frac{q_2}{Q_2}$ | 2 |
| | $Q_1$ | | 0 | $2Q_2$ | | 0 | - | | - | $26\frac{q_i}{Q_i}$ | 3 |
| 26+106 | $26q_1$ | | 0 | $106q_2$ | | 0 | - | | - | 1 | 1 |
| | $\underbrace{Q_1,\ldots,Q_1}_{26q_1/Q_1},0,\ldots,0$ | | 0 | $\underbrace{Q_2,\ldots,Q_2}_{106q_2/Q_2}$ | | 0 | - | | - | $106\frac{q_2}{Q_2}$ | 2 |
| | $Q_1$ | | 0 | $4Q_2$ | | $q_2$ | - | | - | $26\frac{q_i}{Q_i}$ | 4 |
| | $Q_1$ | | 0 | $\underbrace{4Q_2+q_2,}_{24q_2/Q_2}\atop 4Q_2+q_2$ | | 0 | - | | - | $26\frac{q_i}{Q_i}$ | 4 |
| 242+484 | $242q_1$ | | 0 | $484q_2$ | | 0 | - | | - | 1 | 1 |
| | $\underbrace{Q_1,\ldots,Q_1}_{242q_1/Q_1},0,\ldots,0$ | | 0 | $\underbrace{Q_2,\ldots,Q_2}_{484q_2/Q_2}$ | | 0 | - | | - | $484\frac{q_2}{Q_2}$ | 2 |
| | $Q_1$ | | 0 | $2Q_2$ | | 0 | - | | - | $242\frac{q_i}{Q_i}$ | 3 |
| 242+996 | $242q_1$ | | 0 | $996q_2$ | | 0 | - | | - | 1 | 1 |
| | $\underbrace{Q_1,\ldots,Q_1}_{242q_1/Q_1},0,\ldots,0$ | | 0 | $\underbrace{Q_2,\ldots,Q_2}_{996q_2/Q_2}$ | | 0 | - | | - | $996\frac{q_2}{Q_2}$ | 2 |
| | $Q_1$ | | 0 | $4Q_2$ | | $14q_2$ | - | | - | $242\frac{q_i}{Q_i}$ | 4 |

Fig. 16

Table 2 (cont'd)

| | | | | | | | | |
|---|---|---|---|---|---|---|---|---|
| 484+996 | $Q_1$ | 0 | $\{\underbrace{5Q_2, 4Q_2, \ldots, 4Q_2}_{10}\}$, $22\frac{q_2}{Q_2}$ | $3q_2$ | – | – | $242\frac{q_i}{Q_i}$ | 4 |
| | $484q_1$ | 0 | $996q_2$ | 0 | – | – | 1 | 1 |
| | $\{\underbrace{Q_1, \ldots, Q_1, 0, \ldots, 0}_{484\,q_1/Q_1}\}$ | 0 | $\{\underbrace{Q_2, \ldots, Q_2}_{996\,q_2/Q_2}\}$ | 0 | – | – | $996\frac{q_2}{Q_2}$ | 2 |
| | $Q_1$ | 0 | $2Q_2$ | $14q_2$ | – | – | $484\frac{q_i}{Q_i}$ | 4 |
| | $Q_1$ | 0 | $\{\underbrace{3Q_2, 2Q_2, \ldots, 2Q_2}_{21}\}$, $22\frac{q_2}{Q_2}$ | $3q_2$ | – | – | $484\frac{q_i}{Q_i}$ | 4 |
| N+N | $Nq_1$ | 0 | $Nq_2$ | 0 | – | – | 1 | 1 |
| | $Q_1$ | 0 | $Q_2$ | 0 | – | 0 | $N\frac{q_i}{Q_i}$ | 3 |
| N+N+N | $Nq_1$ | 0 | $Nq_2$ | 0 | $Nq_3$ | 0 | 1 | 1 |
| | $Q_1$ | 0 | $Q_2$ | 0 | $Nq_3$ | 0 | $N\frac{q_i}{Q_i}$ | 3 |
| | $Q_1$ | 0 | $Q_2$ | 0 | $\{\underbrace{Q_3, \ldots, Q_3, 0, \ldots, 0}_{484\,q_3/Q_3}\}$ | 0 | 1 | 1 |
| 242+996+484 | $242q_1$ | 0 | $\{\underbrace{Q_2, \ldots, Q_2}_{996\,q_2/Q_2}\}$ | 0 | $2Q_2$ | 0 | $996\frac{q_2}{Q_2}$ | 2 |
| | $Q_1$ | 0 | $4Q_2$ | $14q_2$ | $2Q_2$ | 0 | $242\frac{q_i}{Q_i}$ | 4 |
| | $Q_1$ | 0 | $\{\underbrace{5Q_2, 4Q_2, \ldots, 4Q_2}_{10}\}$, $22\frac{q_2}{Q_2}$ | $3q_2$ | $2Q_2$ | 0 | $242\frac{q_i}{Q_i}$ | 4 |

Fig. 16 (cont'd)

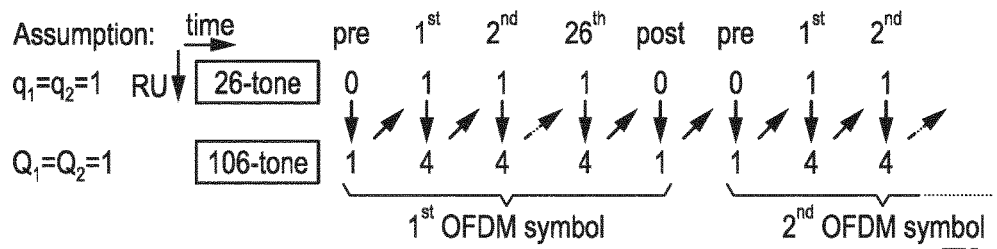
Fig. 20A
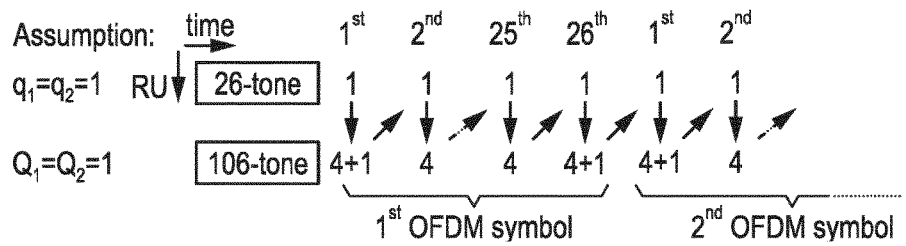
Fig. 20B
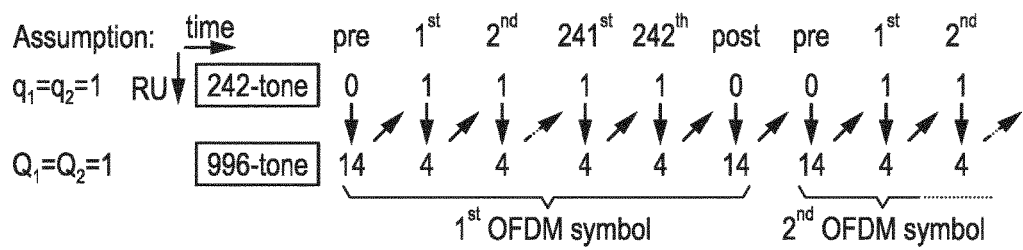
Fig. 20C
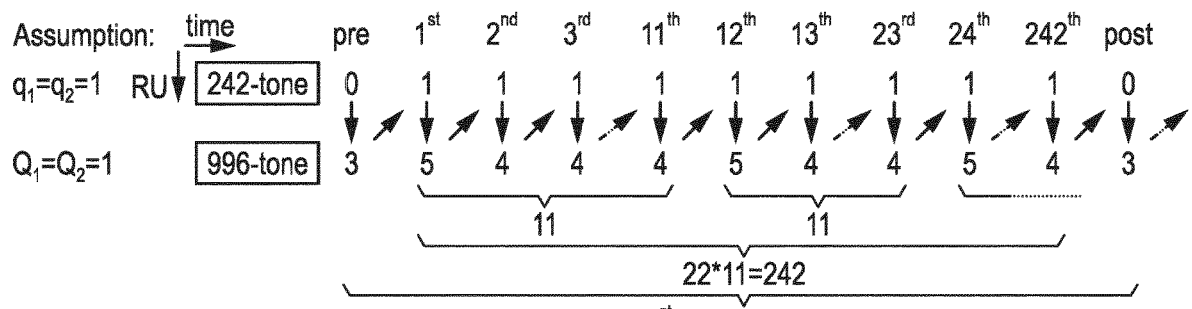
Fig. 20D
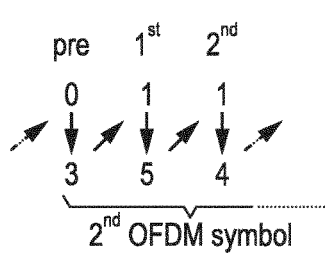

COMMUNICATION DEVICES AND METHODS

CROSS-REFERENCE TO RELATED APPLICATIONS

The present application is based on PCT filing PCT/EP2021/054129, filed Feb. 19, 2021, which claims priorities to EP 20163435.9, filed on Mar. 16, 2020 and EP 20165517.2, filed on Mar. 25, 2020, the entire contents of each are incorporated herein by reference.

BACKGROUND

Field of the Disclosure

The present disclosure relates to communication devices and methods, in particular for use in a Wireless LAN (WLAN).

Description of Related Art

Communication systems, e.g. in accordance with IEEE802.11ax, feature orthogonal frequency division multiple access (OFDMA). OFDMA subdivides the channel bandwidth in subsections very efficiently. These subsections are often called resource unit (RU). In IEEE802.11ax different RUs may be allocated to different users (communication devices).

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide communication devices and methods that enable allocation of multiple resource units to a single user and that achieve high diversity with the codes and constellation diagrams, particularly provided by the IEEE 802.11 WLAN standard. It is a further object to provide a corresponding computer program and a non-transitory computer-readable recording medium for implementing the communication methods.

According to an aspect there is provided a first communication device configured to communicate with a second communication device, the first communication device comprising circuitry configured to
  encode data words of an input bit stream to be transmitted to the second communication device into code words of an encoded bit stream;
  allocate the bits of the encoded bit stream to two or more resource units assigned to the second communication device and covering different subsections of a channel bandwidth,
  wherein at least two of the two or more resource units cover subsections having a different number of tones,
  wherein a number of bits of the encoded bit stream allocated to a resource unit is proportional to the number of tones of the subsection covered by the resource unit,
  wherein the bits to be allocated to the two or more resource units are alternately allocated to the two or more resource units in a cycle having two or more alternations,
  wherein, for a first portion of the bits to be allocated to the two or more resource units in one cycle, a first ratio of the predetermined numbers of consecutive bits alternately allocated to two resource units is based on the number of tones of subsections covered by said two resource units and the modulation order of a modulation of the bits allocated to the respective resource unit, and
  wherein, for a second portion of the bits to be allocated to two or more resource units in one cycle, a second ratio of the predetermined numbers of consecutive bits alternately allocated to two resource units is different from the first ratio,
  groupwise map, per resource unit, bits of the encoded bit stream allocated to the respective resource unit to symbols of a constellation, and
  assign the resource units to the respective subsection of the channel bandwidth in the frequency domain.

According to a further aspect there is provided a second communication device configured to communicate with a second communication device, the second communication device comprising circuitry configured to
  extract, from a received signal in the frequency domain, tones of different subsections of a channel bandwidth that are covered by two or more resource units assigned to the second communication device, wherein at least two of the two or more resource units cover subsections having a different number of tones,
  groupwise demap, per resource unit, bits of an encoded bit stream allocated to the respective resource unit from symbols of a constellation,
  retrieve from two or more resource units the bits of the encoded bit stream,
  wherein a number of bits of the encoded bit stream allocated to a resource unit corresponds to the number of tones of the subsection covered by the resource unit,
  wherein the bits allocated to the two or more resource units in one cycle are alternately retrieved from the two or more resource units in two or more alternations,
  wherein, for a first portion of the bits allocated to the two or more resource units in one cycle, a first ratio of the predetermined numbers of consecutive bits alternately retrieved from two resource units is based on the number of tones of subsections covered by said two resource units and the modulation order of a modulation of the bits allocated to the respective resource unit, and
  wherein, for a second portion of the bits allocated to two or more resource units in one cycle, a second ratio of the predetermined numbers of consecutive bits alternately retrieved from two resource units is different from the first ratio,
  decode code words of the encoded bit stream into data words of an output bit stream.

According to a further aspect there is provided a first communication method configured to communicate with a second communication device, the first communication method comprising
  encoding data words of an input bit stream to be transmitted to the second communication device into code words of an encoded bit stream;
  allocating the bits of the encoded bit stream to two or more resource units assigned to the second communication device and covering different subsections of a channel bandwidth,
  wherein at least two of the two or more resource units cover subsections having a different number of tones, wherein a number of bits of the encoded bit stream allocated to a resource unit is proportional to the number of tones of the subsection covered by the resource unit, wherein the bits to be allocated to the two or more resource units are alternately allocated to the two or more resource units in a cycle having two or more alternations, wherein, for a first portion of the bits to be allocated to the two or more resource units in one cycle, a first ratio of the predetermined numbers of consecutive bits alternately allocated to two resource units is based on the number of tones of subsections covered by said two resource units and the modulation order of a modulation of the bits allocated to the respective resource unit, and wherein, for a second portion of the bits to be allocated to two or more resource units in one cycle, a second ratio of the predetermined numbers of consecutive bits alternately allocated to two resource units is different from the first ratio, groupwise mapping, per resource unit, bits of the encoded bit stream allocated to the respective resource unit to symbols of a constellation, and assigning the resource units to the respective subsection of the channel bandwidth in the frequency domain.

According to a further aspect there is provided a second communication method configured to communicate with a first communication device, the second communication method comprising extracting, from a received signal in the frequency domain, tones of different subsections of a channel bandwidth that are covered by two or more resource units assigned to the second communication device, wherein at least two of the two or more resource units cover subsections having a different number of tones;

groupwise demapping, per resource unit, bits of an encoded bit stream allocated to the respective resource unit from symbols of a constellation;

retrieving from two or more resource units the bits of the encoded bit stream, wherein a number of bits of the encoded bit stream allocated to a resource unit corresponds to the number of tones of the subsection covered by the resource unit, wherein the bits allocated to the two or more resource units in one cycle are alternately retrieved from the two or more resource units in two or more alternations, wherein, for a first portion of the bits allocated to the two or more resource units in one cycle, a first ratio of the predetermined numbers of consecutive bits alternately retrieved from two resource units is based on the number of tones of subsections covered by said two resource units and the modulation order of a modulation of the bits allocated to the respective resource unit, and wherein, for a second portion of the bits allocated to two or more resource units in one cycle, a second ratio of the predetermined numbers of consecutive bits alternately retrieved from two resource units is different from the first ratio, decoding code words of the encoded bit stream into data words of an output bit stream.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication device and methods and as defined in the dependent claims and/or disclosed herein.

According to IEEE802.11ax, different RUs can be allocated to different users only. However, in some cases, it has been recognized that it may make sense to allocate more than one RU to a single user. One example is an interference scenario: If, as an example, the total channel bandwidth is divided into three RUs, e. g. the RU in the middle may be disturbed by interference or have a high noise level which may make this noisy RU unusable or undesired for communication. Since communication systems often employ encoding across the bandwidth, a noisy RU may result in an elevated overall error rate, which is dominated by bit errors generated by the noisy RU. Thus, allocation of two RUs, i.e. all except the noisy RU, to a single user may reduce the overall error rate.

According to the present disclosure, an assignment of multiple RUs to a single user (i.e. a single communication device, such as a station (STA), also referred to as "second communication device" herein) may be implemented, the assignment being performed by another communication device (such as another station or an access point (AP), also referred to as "first communication device" herein). The communication devices and methods of the present disclosure are preferably directed to communication via multiple resource units in orthogonal frequency division multiple access (OFDMA).

According to an aspect of the present disclosure bits of a continuous bit stream are allocated to RUs of different sizes. Various options are disclosed that differ in both implementation complexity and diversity achieved. Furthermore, exemplary implementations are provided that consider the definition of RUs of IEEE802.11ax as a baseline and outline the operation of the bit allocation for combination of resource units of various sizes.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 16 shows a table giving examples of the multi-RU parser operation for various RU combinations.

FIG. 20 shows four examples illustrating a fourth option for multi-RU allocation using RU size dependent bit assignment including non-alternating bit assignment.

DETAILED DESCRIPTION OF THE EMBODIMENTS

Table 1 gives an overview of different RU sizes as used according to IEEE802.1 lax. The RU size is determined by the number of tones or subcarriers that reside within this RU. A tone of an RU has a center frequency within the bandwidth of that RU.

TABLE 1

| RU size [tones] | 26 | 52 | 106 | 242 | 484 | 996 |
|---|---|---|---|---|---|---|
| Approx. bandwidth [MHz] | 2 | 4 | 8.3 | 18.9 | 37.8 | 77.8 |

RUs are often referred to with their tone size, e.g. 26-tone RU or 52-tone RU, etc. Table 1 assumes a total of 256 tones in each 20 MHz, which is valid for 802.11ax WLANs. As can be also seen from Table 1, an 802.11ax device can operate with 6 different bandwidths. If multiple RUs can be assigned to a single user, more bandwidths may be supported, e.g. a 26-tone RU+a 52-tone RU achieve 6 MHz in total.

Figure 1:
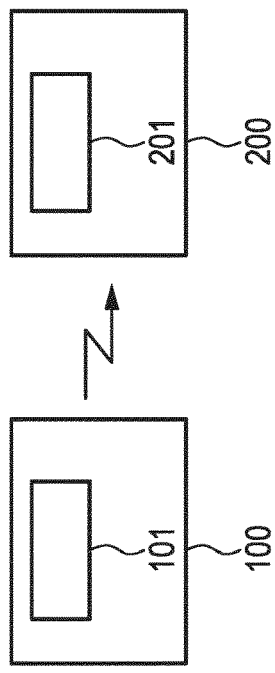
FIG. 1 shows a schematic diagram of first and second communication device according to the present disclosure.

FIG. 1 shows a diagram illustrating a (first) communication device 100 (e.g. an AP) according to an aspect of the present disclosure for communicating with, e.g. transmitting data to, another (second) communication device 200 (e.g. an STA). Each of the communication devices 100, 200 comprises respective circuitry 101, 201 configured to perform particular operations. The circuitries may be implemented by a respective processor or computer, i.e. in hardware and/or software, or by dedicated units or elements. For instance, respectively programmed processors may represent the respective circuitries 101, 201.

Figure 2:
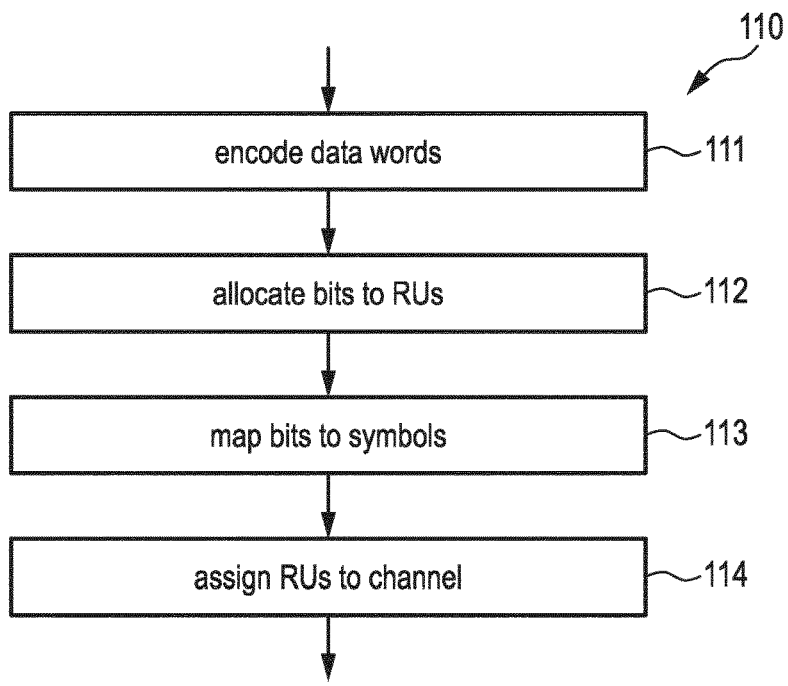
FIG. 2 shows a flow chart of a first communication method according an embodiment of the present disclosure.

FIG. 2 shows a flow chart of a (first) communication method 110 according an embodiment of the present disclosure, which may be performed by the circuitry 101 of the communication device 100 on the transmission side. In a first step 111 data words of an input bit stream to be transmitted to the second communication device 200 are encoded, e.g. according by an error correction code such as an LDPC code, into code words of an encoded bit stream. In a second step 112 the bits of the encoded bit stream, optionally after an additional padding step (not shown), are allocated to two or more resource units assigned to the second communication device 200 and covering different subsections of a channel bandwidth. In a third step 113 bits of the encoded bit stream allocated to the respective resource units are groupwise mapped, per resource unit, to symbols of a constellation. In a fourth step 114 the resource units are assigned to the respective subsection of the channel bandwidth in the frequency domain.

The concept of a so-called tone plan, according to which resource units of different sizes are defined, wherein a fixed number of tones is assigned to each resource unit is generally known from IEEE802.1 lax. Hereby, six different resource unit sizes as shown in Table 1 are defined in a total channel bandwidth. The size of a resource unit or subsection of the overall bandwidth is defined by number of tones or subcarriers that it is covering. In general, a mixture of different RU sizes may be applied to cover the total channel bandwidth. According to IEEE802.11ax no more than one RU can be assigned to a single user.

According to an embodiment of the present disclosure, at least two of the two or more resource units cover subsections of the channel bandwidth having a different number of tones, wherein a number of bits of the encoded bit stream allocated to a resource unit corresponds to the number of tones of the subsection covered by the resource unit. The allocation is done such that bits allocated to the two or more resource units in one cycle are alternately allocated to the two or more resource units in two or more alternations (which may also be called iterations), wherein in each alternation a predetermined number of consecutive bits is allocated to the respective resource unit.

Further, the ratio of the predetermined numbers of consecutive bits alternately allocated to two resource units corresponds to the integer value of the ratio of the number of tones of subsections covered by said two resource units, wherein any potential remainder (that can be calculated in advance) of bits to be allocated to one or more resource units are allocated to the respective resource unit as additional bits in addition to the predetermined number of bits in a first and/or a last alternation of a cycle and/or as pre- and/or post-bits in a pre-assignment and/or post-assignment at the start and/or end of a cycle. The allocation will be explained below in more detail.

Further, in an embodiment of the present disclosure at least two of the two or more resource units cover subsections having a different number of tones, a number of bits of the encoded bit stream allocated to a resource unit is proportional to the number of tones of the subsection covered by the resource unit, and the bits to be allocated to the two or more resource units are alternately allocated to the two or more resource units in a cycle having two or more alternations (generally, in one cycle one RU corresponding to the bits of one symbol (e.g. OFDM symbol) is filled with bits). For a first portion of the bits to be allocated to the two or more resource units in one cycle, a first ratio of the predetermined numbers of consecutive bits alternately allocated to two resource units is based on the number of tones of subsections covered by said two resource units and the modulation order of a modulation of the bits allocated to the respective resource unit, and for a second portion of the bits to be allocated to two or more resource units in one cycle, a second ratio of the predetermined numbers of consecutive bits alternately allocated to two resource units is different from the first ratio.

Figure 3:
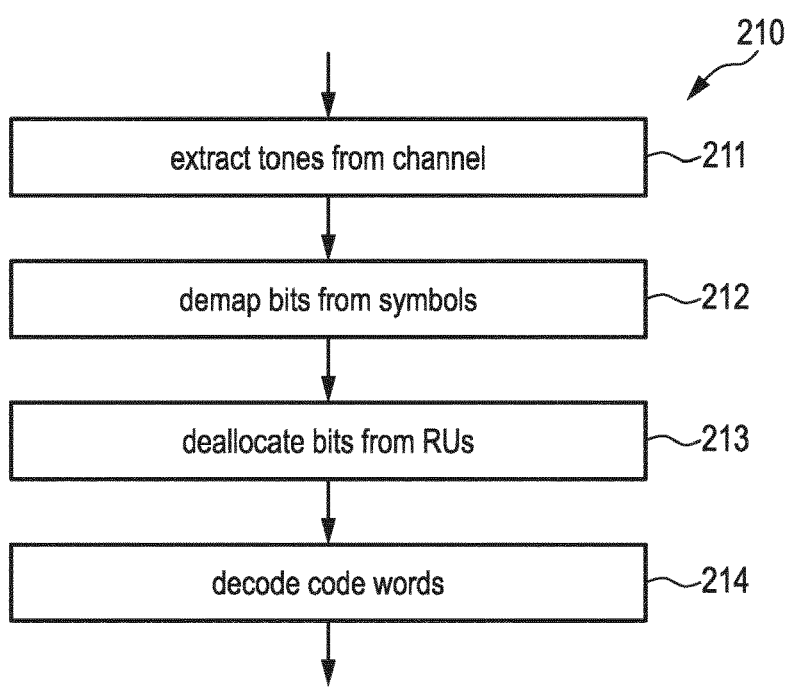
FIG. 3 shows a flow chart of a second communication method according an embodiment of the present disclosure.

FIG. 3 shows a flow chart of a communication method 210 according an embodiment of the present disclosure, which may be performed by the circuitry 201 of the communication device 200 on the reception side. Generally, the communication method 210 performs the inverse operations of the communication method 110. In a first step 211, tones of different subsections of a channel bandwidth that are covered by two or more resource units assigned to the second communication device are extracted from a received signal in the frequency domain. In a second step 212 bits of an encoded bit stream allocated to the respective resource unit are groupwise demapped, per resource unit, from symbols of a constellation. In a third step 213 the bits of the encoded bit stream are retrieved (i.e. deallocated) from two or more resource units. In a fourth step 214 code words of the encoded bit stream, optionally after an additional padding removal step (not shown), are decoded into data words of an output bit stream.

It shall be noted that the communication methods 110 and 210 may, in other embodiments, comprise further steps at the start or end or in between the steps illustrated in FIGS. 2 and 3.

Figure 4:
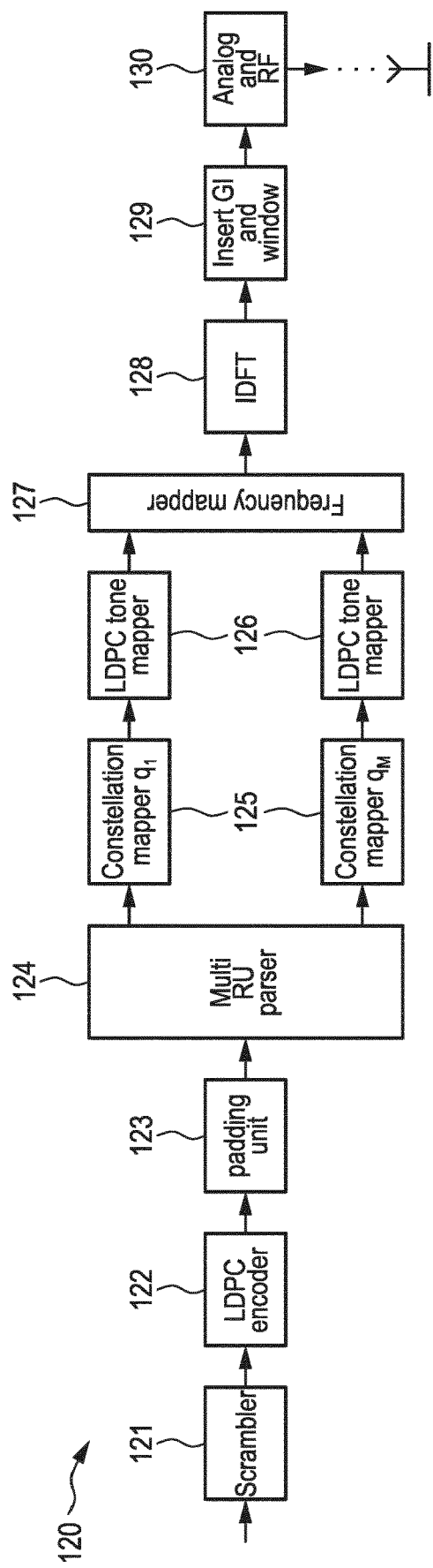
FIG. 4 shows a schematic diagram of another embodiment of a first communication device according to the present disclosure in a single user case having a single spatial stream.

FIG. 4 shows a schematic diagram of another embodiment of a first communication device 120 according to the present disclosure, which may be used as a PHY (physical) layer transmitter. FIG. 4 illustrates the transmitter operation for a single user (SU) having a single spatial stream but multiple resource units assigned.

The communication device 120 comprises a scrambler 121 that randomizes the bits of the input bit stream (provided e.g. by a MAC layer) to be transmitted, an LDPC encoder 122 that adds parity information to the scrambled bit sequence to obtain code words of an encoded bit stream and a padding unit 123 that adds bits such that a certain length of the encoded bit stream is achieved. A multi-RU parser 124 allocates the bits to M different $N_i$-size RUs that are assigned to a single user. A constellation mapper 125, provided per RU, (groupwise) maps $q_i$ bits for RUi to a symbol of a constellation and an LDPC tone mapper 126, provided per RU, interleaves symbols over the available tones. The LDPC tone mappers 126 are followed by a frequency mapping unit 127 that assigns the RUs to their respective location in the frequency domain. An IDFT (inverse discrete Fourier transform) unit 128 performs an IDFT operation, followed by GI (guard interval) insertion and windowing of a GI insertion and windowing unit 129 and an analog and RF unit 130 that upconverts the transmit signal to the desired center frequency.

Figure 5:
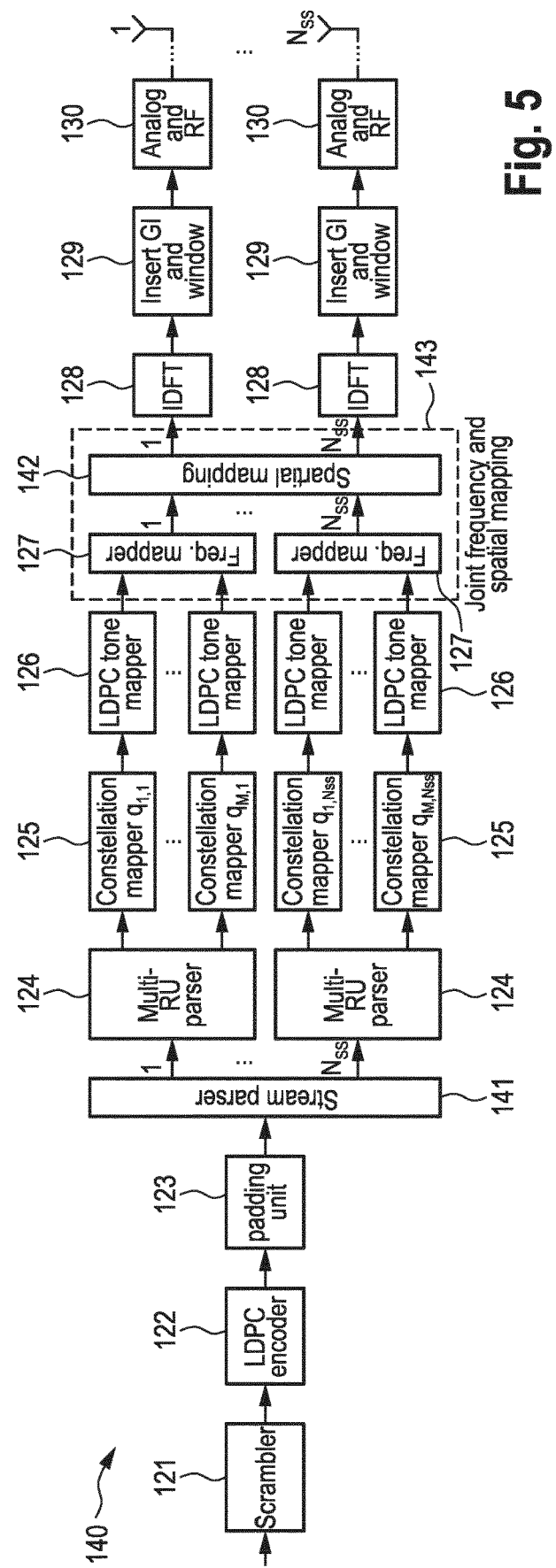
FIG. 5 shows a schematic diagram of another embodiment of a first communication device according to the present disclosure in a single user case having multiple spatial streams.

FIG. 5 shows a schematic diagram of another embodiment of a first communication device 140 according to the present disclosure for a single user (SU) having $N_{ss}$ spatial streams separated by a stream parser 141 provided after the padding unit 123. In this configuration, each spatial stream has its own multi-RU parser 124. In the most general case, each constellation mapper 125 may have a different number of bits per symbol q and each multi-RU parser 124 may have different number of RUs to which it allocates bits. In some cases, it may be applicable to use only one RU, i.e. M=1, for a certain spatial stream. In this case, the multi-RU parser may be dropped. Furthermore, each multi-RU parser 124 has its own frequency mapping unit 127 which allocates the RUs in the frequency range.

Following the frequency mapping unit 127, $N_{ss}$ spatial streams are allocated spatially by the spatial mapper 142, i.e. each spatial stream or a linear combination of spatial streams is allocated to a transmit chain or a transmit antenna. The configuration of the spatial mapper 142 may be done based on feedback from the receiver to achieve high beamforming gain. It may be envisioned that frequency mapping and spatial mapping are done jointly in a single frequency and spatial mapping unit 143. In case spatial separation is sufficient, RUs may overlap in frequency domain, i.e. a frequency mapping unit 127 may allocate RUs such that they overlap with the frequency mapping of another frequency mapping unit 127. Within a frequency mapping unit 127, an overlap is not preferred.

Figure 6:
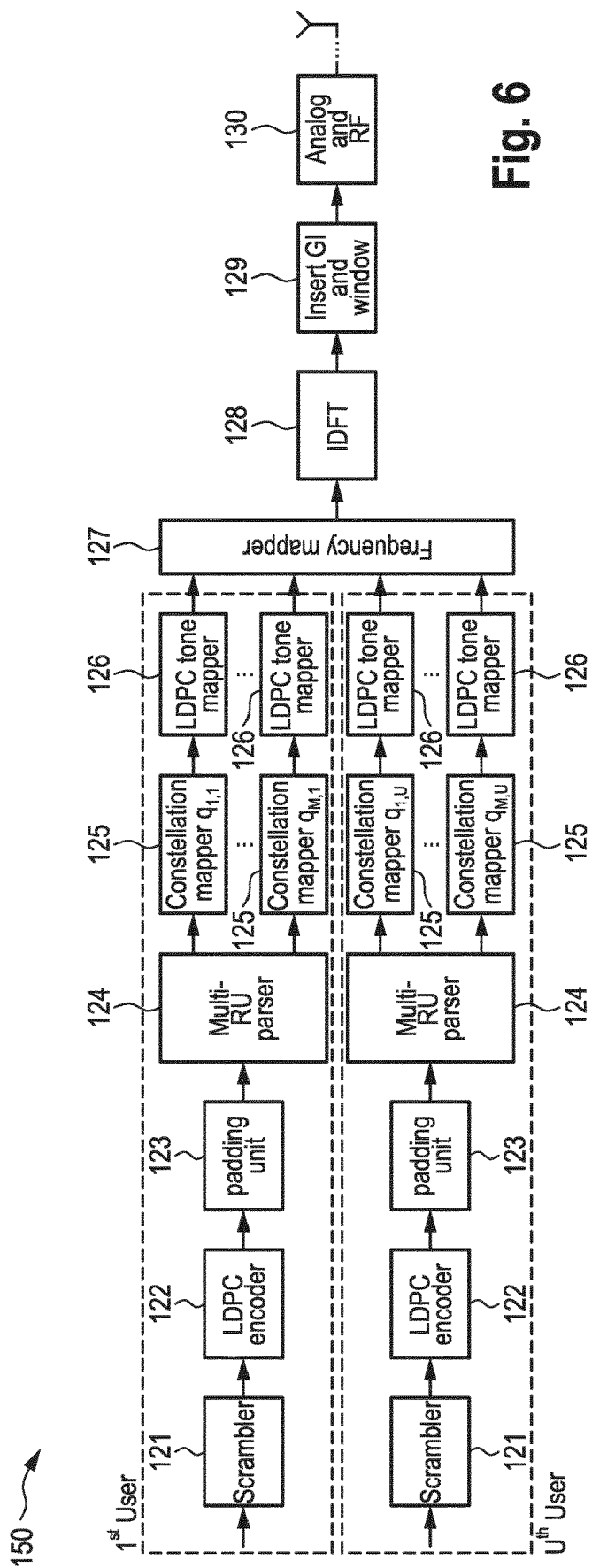
FIG. 6 shows a schematic diagram of another embodiment of a first communication device according to the present disclosure in a multiuser case.

FIG. 6 shows a schematic diagram of another embodiment of a first communication device 150 according to the present disclosure in a multiuser (MU) case, according to which data to U users are multiplexed in one PHY protocol data unit (PPDU). In this embodiment, it is assumed that multiplexing is performed in the frequency domain and that only one transmit antenna is present. Multiplexing may also be done in the spatial domain, i.e. in MU-MIMO fashion, which would result in a combination of the first communication devices 140 and 150. In this case the spatial mapping unit 142 is configured such that each user can extract its data from the spatially multiplexed PPDU. According to FIG. 6, however, the scrambler 121, LDPC encoder 122 and padding unit 123 are duplicated for each of the U users. The frequency mapping unit 127 combines the output of each LDPC tone mapper 126 of each user. Frequency mapping is non-overlapping such that each RU can be demodulated without interference.

Figure 7:
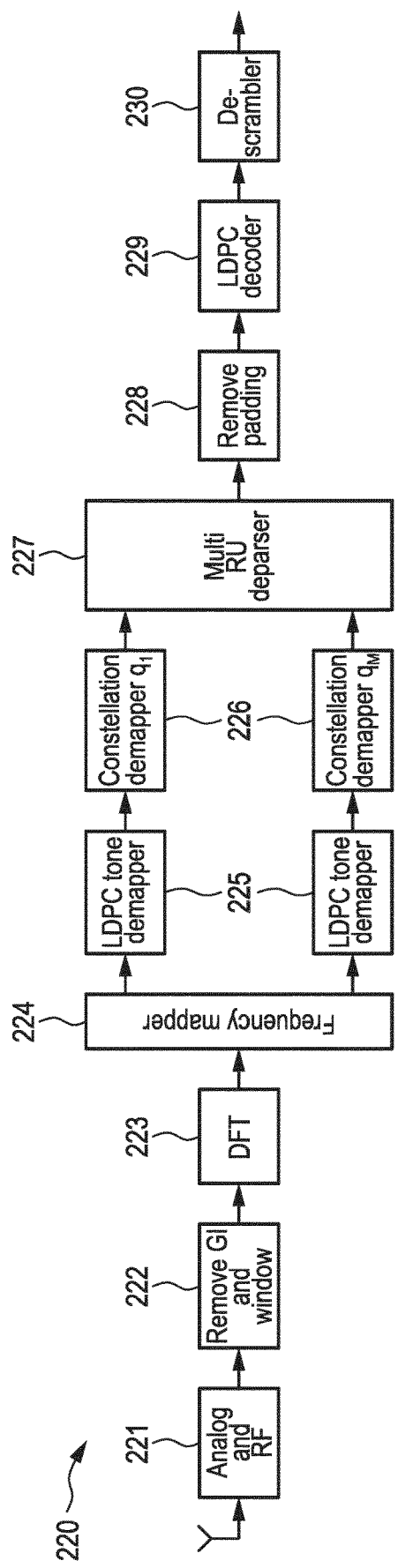
FIG. 7 shows a schematic diagram of another embodiment of a second communication device according to the present disclosure.

FIG. 7 shows a schematic diagram of another embodiment of a second communication device 220 according to the present disclosure, which may be used as a PHY layer receiver that is designed to demodulate data transmitted by the first communication device 120 shown in FIG. 4 or 150 shown in FIG. 6. After the received waveform has been down-converted by the analog and RF unit 221, the guard interval is removed in a guard interval removal and windowing unit 222 and a DFT unit 223 extracts the subcarriers or tones of an entire OFDM symbol. A frequency demapping unit 224 extracts the tones of the resource units that are allocated to the specific user. For each RU an LDPC tone demapping unit 225 as well as constellation demapping unit 226 is provided. A multi-RU deparser 227 performs the inverse operation of the multi-RU parser 124 of the first communication device 120. The multi-RU parser 124 and the multi-RU deparser 227 will be explained in more detail below. After padding is removed by a padding removal unit 228, the received bits are LDPC decoded by an LDPC decoder 229 and descrambled by a descrambler 230 before they are provided to the user's MAC layer for further processing.

In any one of the embodiments of the first communication device described above the constellation mapper 125 creates one symbol once $q_i$ bits arrived at its input. Once $N_i$ symbols arrived, a $N_i$ size RU of an OFDM symbol is complete. The assignment of a symbol to tone depends on the LDPC tone mapper 126. In case the LDPC tone mapper 126 performs a one to one (1:1) mapping, each symbol gets assigned to increasing tone index, i.e. from low to high tone center frequency.

It is assumed that M>1 RUs are allocated to a single user and that 1≤i≤M holds. It is further assumed that RU indices are sorted by increasing frequency, i.e. the frequency range spanned by RU with i=1 is smaller than that of RU with i=2 and so on.

The multi-RU parser 124 is generally difficult to design because RU sizes exist that are a non-integer multiple of each other. Furthermore, it is desired that bit allocation for each RU being part of a multi-RU assignment does not overlap the OFDM symbol boundary. This means that the bit allocation operation for each RU finishes after all $N_i$ tones of RU i are supplied with bits to be transmitted. In other words, a bit allocation operation that works over consecutive OFDM symbols, i.e. multiple of $N_i$ tones, is not desired. This is mainly due to complexity reasons since buffers, which are longer than OFDM symbol size, are avoided by the previous constraint.

Figure 8:
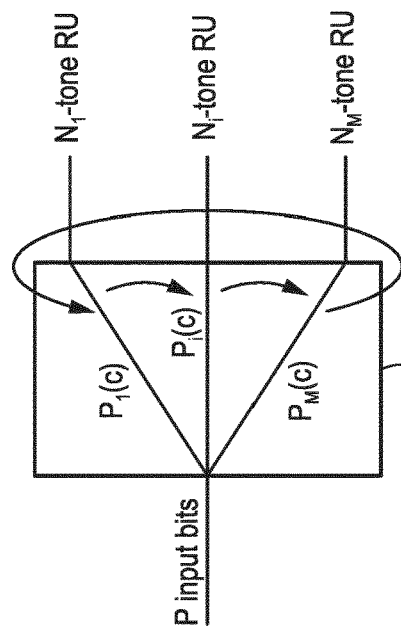
FIG. 8 shows a more detailed diagram of an embodiment of the multi-RU parser.

FIG. 8 shows a more detailed diagram of an embodiment of the multi-RU parser 124 that operates as follows: A total of P bits is assumed at the input of the multi-RU parser 124 which originate from the LDPC encoder 122 optionally followed by a padding unit 123.

The multi-RU parser 124 operates in a total of C cycles. C is an integer multiple of $C_0$ which denotes the number of alternations per OFDM symbol or cycle. In each alternation, $p_1(c)$ consecutive bits are allocated to the first RU of size $N_1$, followed by another $p_2(c)$ consecutive bits that are allocated to the second RU of size $N_2$. An alternation ends when $p_M(c)$ bits are allocated to the last ($M^{th}$) RU of size $N_M$. The number of bits that are allocated to each RU may depend on the actual alternation index c within an OFDM symbol, i.e. 1≤c≤$C_0$. Thus, alternation $c_j$ assigns $\Sigma_{i=1}^{M} p_i(c_j)$ bit to resource units. In case more input bits are present than can be allocated in $C_0$ alternations, further cycles, i.e. multiples of $C_0$ alternations are executed in the same way as the first $C_0$ alternations. Thus, the number of cycles, which equals the number of OFDM symbols, is $$C = \frac{P}{\sum_{j=1}^{C_O} \sum_{i=1}^{M} p_i(c_j)} \quad (1)$$

and the number of bits allocated within each OFDM symbol (in $C_0$ alternations) is $$\sum_{j=1}^{C_O} \sum_{i=1}^{M} p_i(c_j) = \sum_{i=1}^{M} q_i N_i \quad (2)$$

Figure 9:
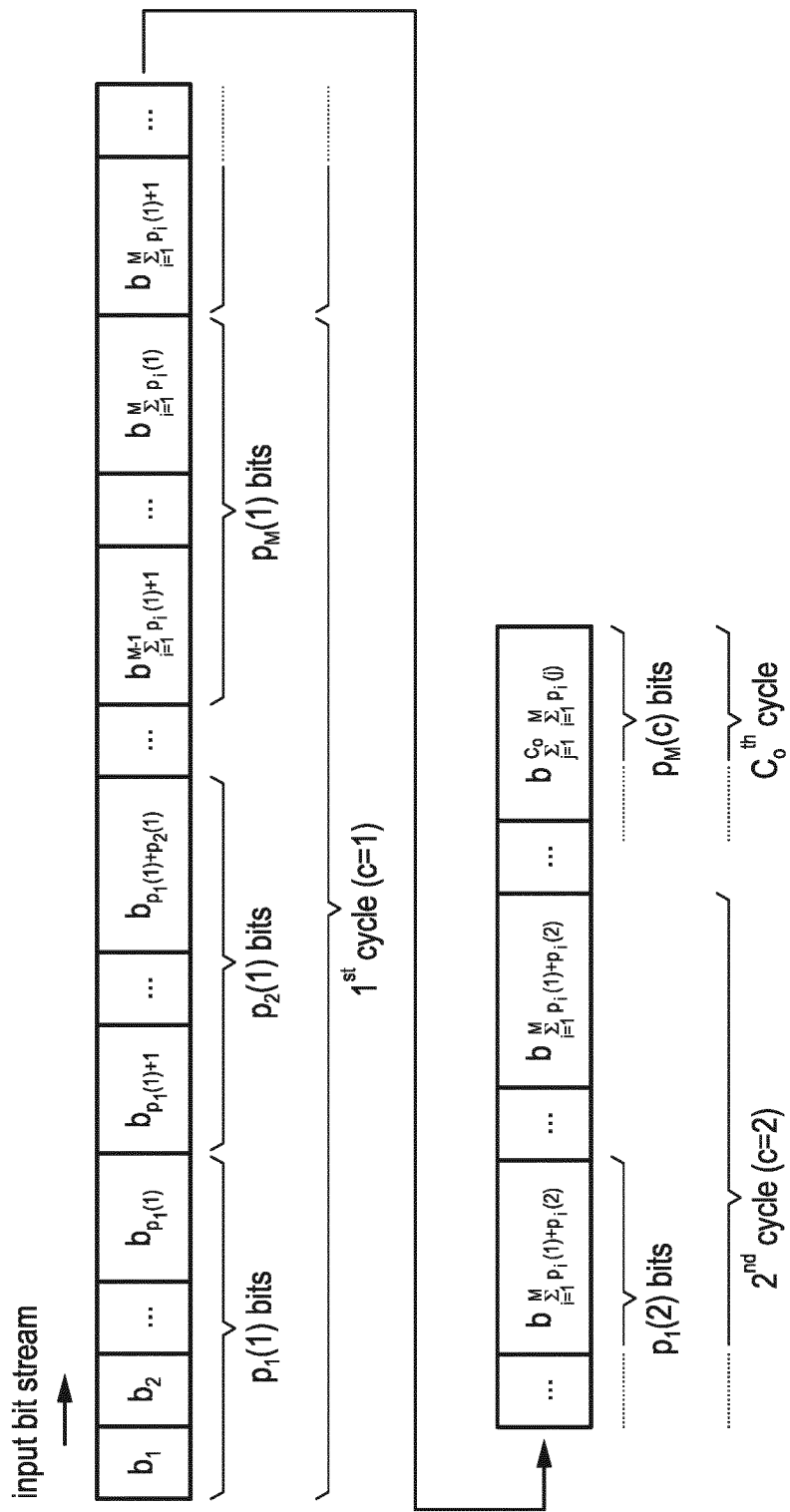
FIG. 9 shows a diagram illustrating the bit-wise operation of the multi-RU parser.

FIG. 9 shows the previously described multi-RU parser operation in bit-wise operation.

The padding unit 123 operates such that P is an integer multiple of the number of bits allocated in $C_0$ alternations. This means that $C_0$ alternations are completed. This causes the number of cycles C to be an integer number. The number of padded bits complements the total number of bits at the output of the LDPC encoder 122 in the following sense:

$$P = P_{LDPC} + P_{pad} \text{ with} \quad (3)$$

$$P_{pad} = \lceil C_{frac} \rceil \cdot \left( \sum_{j=1}^{C_O} \sum_{i=1}^{M} p_i(c_j) \right) - P_{LDPC} \text{ and}$$

$$C_{frac} = \frac{P_{LDPC}}{\sum_{j=1}^{C_O} \sum_{i=1}^{M} p_i(c_j)} \quad (4)$$

wherein $C=\lceil C_{frac} \rceil$ denotes the number of cycles and is derived by rounding $C_{frac}$ up to the next integer.

Figure 10:
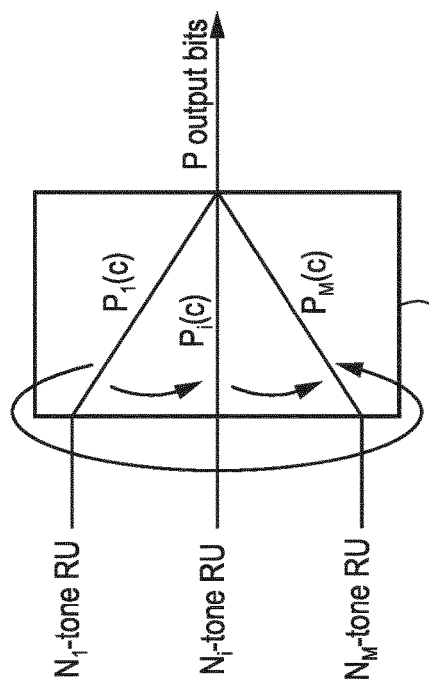
FIG. 10 shows a more detailed diagram of an embodiment of the multi-RU deparser.

FIG. 10 depicts a more detailed diagram of an embodiment of the multi-RU deparser 227 that operates as follows. In principle, it performs the inverse operation of the multi-RU parser 124. Conceptually, the multi-RU deparser 227 has a buffer memory at each input port that stores the bits that originate from each constellation demapper 226. Once the bits of an entire OFDM symbol are available in the memory, the multi-RU deparser 227 assembles the output bit stream by concatenating the first $p_1(c=1)$ bits from the memory of the first $N_1$-tone RU with the first $p_i(c=1)$ bits from the memory of the $i^{th}$ $N_i$-tone RU and so on (i=2, ..., M−1). After the first $p_M(c=1)$ bits from the memory of the $i^{th}$ $N_M$-tone RU have been concatenated, the next alternation (if present) is triggered and $p_1(c=2)$ bits with index $p_1(c=1)+1$ to $p_1(c=1)+p_1(c=2)$ are concatenated to the output bit stream. This process continues until the last alternation $C_0$ of the current OFDM symbol is reached. At this time each memory is empty and bits of the next OFDM symbol can be stored. Depending on hardware implementation, an output buffer of the output of the multi-RU deparser 227 may be needed on top in order to implement the bit concatenation.

There are several options for $p_i(c)$ and $C_0$.

According to a first option continuous bit allocation ($C_0=1$, $p_i(c)=p_i$) may be applied. In an implementation, the multi-RU parser operates such that consecutive output bits of the LDPC encoder 122 (or padding unit 123) are allocated consecutively to tone index. Thereby, multiple RUs are thought of lying (virtually) side by side, i.e. the number of available tones in multi-RU is $$\sum_{i=1}^{M} N_i.$$

The multi-RU parser 124 allocates $p_i=q_i \cdot N_i$ bits to $N_i$ tones consecutively from i=1, ..., M. As can be seen from equation (2), $C_0=1$ holds.

Figure 17A:
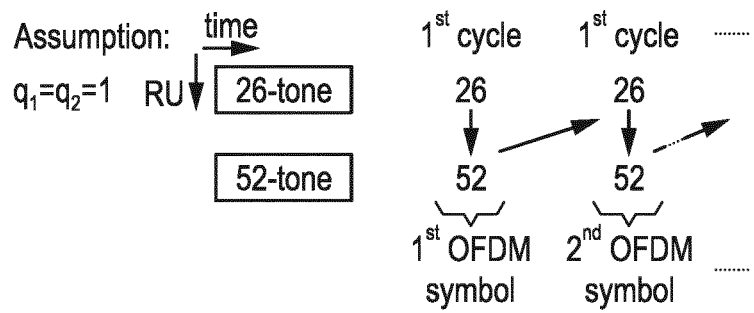
FIG. 17 shows two examples illustrating a first option for multi-RU allocation using continuous bit allocation.
Figure 17B:
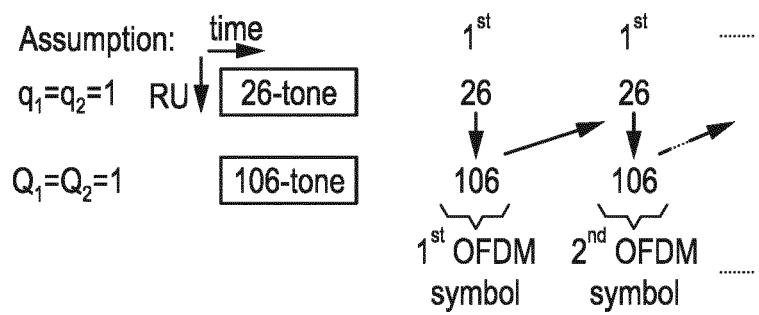

Examples illustrating the first option are shown in FIGS. 17A and 17B. In FIG. 17A, for instance, one cycle comprises a single alternation since in a single alternation all bits are allocated to an OFDM symbol of the respective RU.

Figure 11:
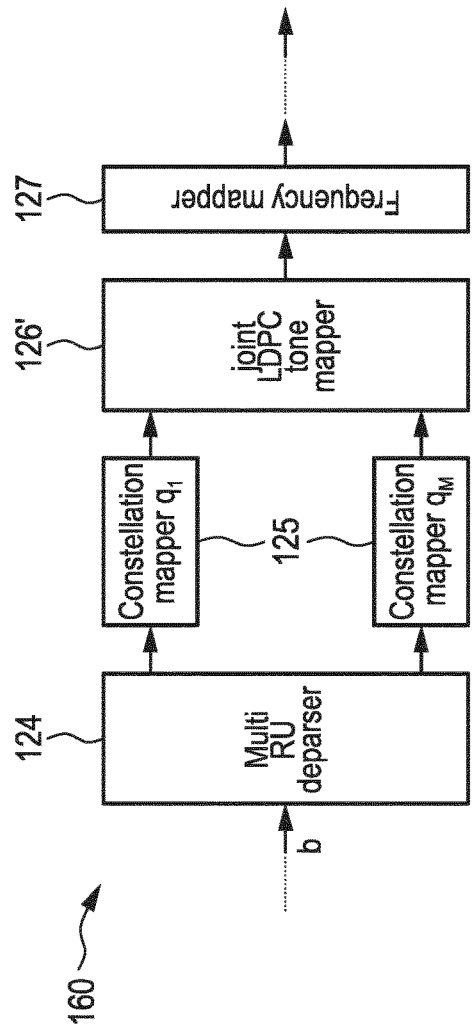
FIG. 11 shows a schematic diagram of another embodiment of a first communication device according to the present disclosure using a joint LDPC tone mapper.

This first option is simple to implement, but diversity may not fully be exploited. The latter is in particular true if the RUs are non-contiguous, i.e. reside in different regions of the overall bandwidth. Diversity may be enhanced by a single LDPC tone mapper 126' as illustrated in FIG. 11 showing a schematic diagram of another embodiment of a first communication device 160, instead of RU-distinct LDPC tone mappers 126 as used in the embodiments shown in FIGS. 4 to 6. In the embodiment of FIG. 11 the joint LPDC tone mapper 126' works on tones but not bits, so that a defect tone may affect a block of $q_i$ bits that may be hard to correct by the LDPC decoder 229 which is in favor of distributed error patterns. Furthermore, a joint LDPC tone mapper 126' comes with delay and high memory complexity because many tones, namely $$\sum_{i=1}^{M} N_i,$$

need to be interleaved.

Alternating bit assignment may avoid the drawback of the continuous bit mapping as will be described in the following.

Figure 12:
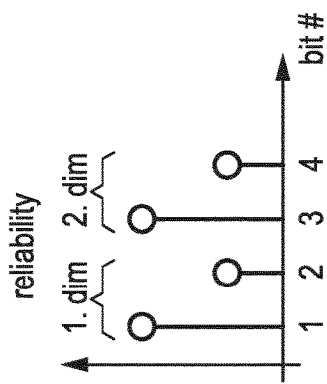
FIG. 12 shows a diagram of the bit reliability distribution for 16-QAM in WLAN standards.

Before going to the details of how $p_i(c)$ is selected with alternating bit assignment, it is important to consider the effect of constellation mapping. In WLAN (IEEE802.11), the constellation mapping is done such that the reliability of bits is sorted in decreasing order and per dimension of the constellation diagram as shown in FIG. 12 for 16-QAM, i.e. q=4 bits per symbol.

For each dimension, the most reliable bit is the bit that differentiates between positive and negative axis. In other words, this bit determines if the signal point in the considered dimension has a positive or negative sign. The second most reliable bit is the bit that differentiates within the positive or negative half-space. In other words, this bit determines which amplitude level the signal point in the considered dimension has. The larger the differentiated amplitude levels are, the more reliable the related bit is. As for 16-QAM shown in FIG. 12 there are just two bits per dimension.

In the following, three different cases of the minimum number of consecutive bits are considered that are allocated per each alternation as a function of $q_i$ (when applicable):
a) 1 bit per alternation;
b) $\lfloor q_i/2 \rfloor$ bits per alternation ($\lfloor \bullet \rfloor$ denotes rounding to next lower integer); and
c) $q_i$ bits per alternation.

In the following, the three cases are abbreviated by $Q_i$ which is $$Q_i = \begin{cases} 1 & \text{for a)} \\ \lfloor q_i/2 \rfloor & \text{for b)} \\ q_i & \text{for c)} \end{cases}$$

The respective $p_i(c)$ may be an integer multiple of $Q_i$ and the actual option that is implemented behind the $Q_i$ value may be different for each i of a multi-RU allocation, i.e. $Q_i$ values may be different for different i although $q_i$ is the same. As will be outlined below, these options differ in the diversity that is achieved.

Figure 13B:
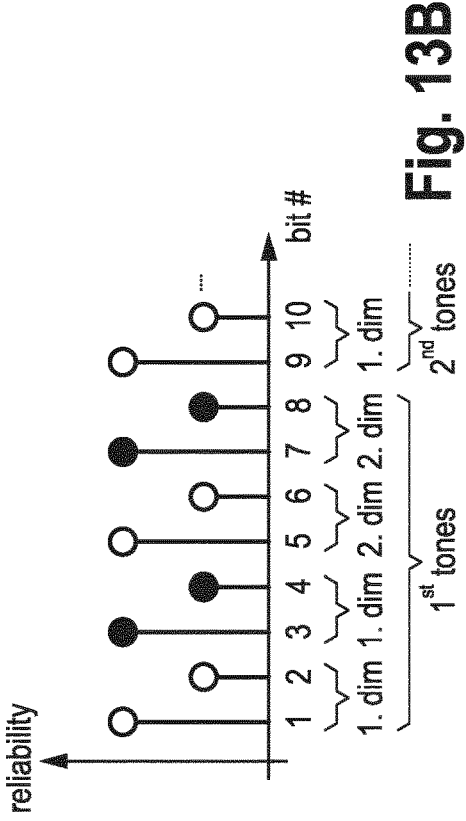
FIG. 13 shows a diagram of the distribution of reliability levels over bit index for four different options.

Different levels of diversity are achieved by the different options of $Q_i$. In multi-RU allocation, it is desired to generate distributed bit reliability because this helps the LDPC decoder 229 to reconstruct erroneous bits. Thereby, reliability levels imposed by constellation diagram (as shown in FIG. 12) as well as reliability levels imposed by multiple RUs may be considered. FIG. 13 shows the distribution of reliability levels over bit index for four different options. Two RUs, each modulated with 16-QAM and same $Q_i$ option, are assumed. FIG. 13A shows bit reliability for $Q_i$ option a), FIG. 13B shows bit reliability for $Q_i$ option b), and shows bit reliability for $Q_i$ option c). The level of distribution decreases from FIG. 13A to FIG. 13C, which can be readily seen by assuming reliability levels of the second RU being zero.

Figure 13D:
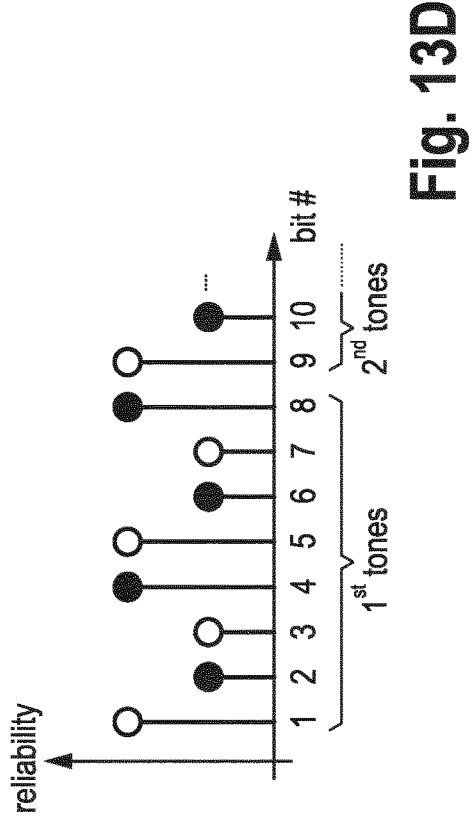
Figure 13A:
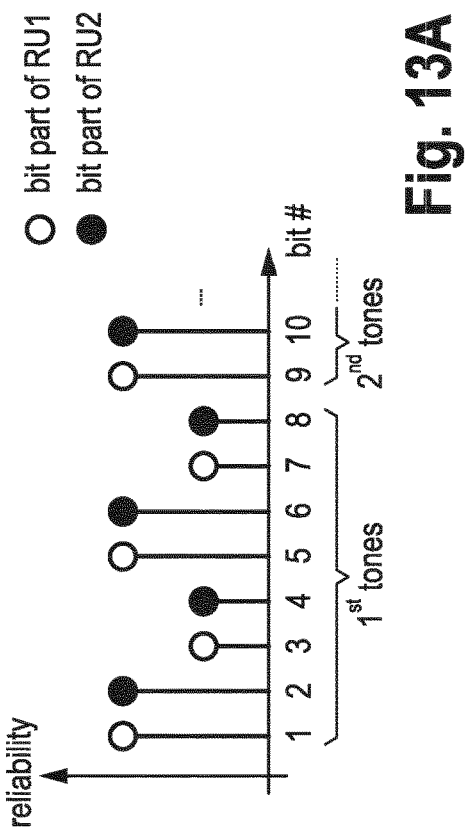
Figure 13C:
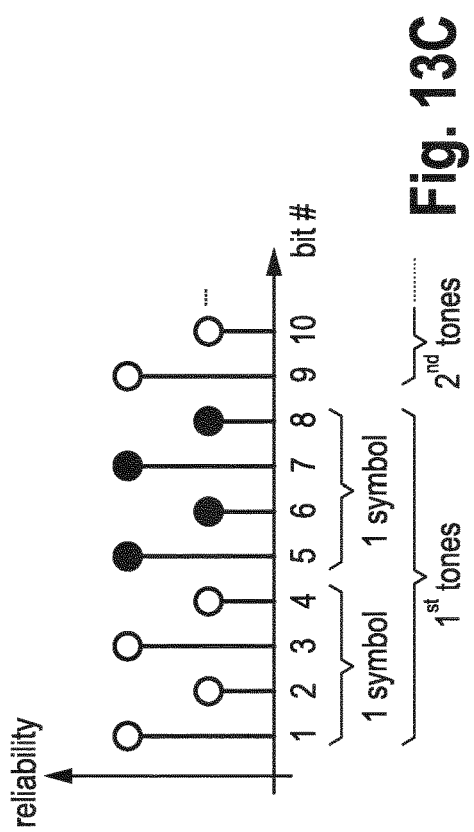
Figure 14:
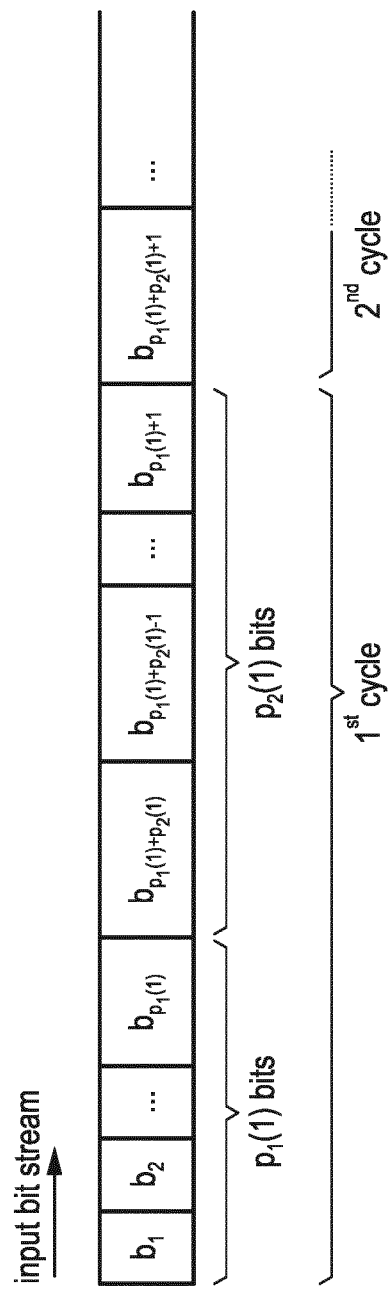
FIG. 14 shows a diagram illustrating a bit-wise multi-RU parser operation for the implementation shown in FIG. 13D.

FIG. 13D shows another variant that corresponds to the variant shown in FIG. 13A, but has in inverted bit allocation for RU 2, i.e. the reliability of bits is not high to low but low to high. In the general case with M>2, every odd allocation is done in consecutive order whereas every second allocation is done in inverse order. For $q_i \geq 6$, the option in FIG. 13D may achieve an even higher diversity order as the option in FIG. 13A. For the inverse operation, the parser operation as shown in FIG. 9 may be changed as illustrated in FIG. 14 for the M=2 case. Operation as shown in FIG. 14 is slightly more complicated to implement, because the parser needs to store bits before they can be output.

According to a second option RU size independent alternating bit allocation ($C_0 > 1$, $p_i(c) \in \{0; Q_i\}$) may be applied. In an implementation, the multi-RU parser 124 operates such that a group of $Q_1$ consecutive bits of the LDPC encoder 122 (or padding unit 123) is allocated to a tone of first RU. After that another group of $Q_2$ bits is allocated to the second RU and so on. Once a group of $Q_M$ bits has been allocated to $M^{th}$ RU, the process starts from the beginning. Since the RU sizes $N_i$ may be different, a small size RU of an OFDM symbol is filled earlier than a large size RU which conflicts with the constraint that multi-RU parsing should not be done over multiple OFDM symbols. In order to evite, the bit allocation to a small RU is stopped once it has been filled. Thus, $p_i(c)$ has a segment-wise definition:

$$p_i(c) = \begin{cases} Q_i & \text{if } 1 \leq c \leq \dfrac{N_i \cdot q_i}{Q_i} \\ 0 & \text{else} \end{cases}$$

wherein $$1 \leq c \leq C_O = \max_i \left\{ \dfrac{N_i \cdot q_i}{Q_i} \right\} \text{ holds,}$$

meaning there are as many alternations as are needed to fill the RU unit that requires the most alternations within a cycle to be completely filled.

Figure 18A:
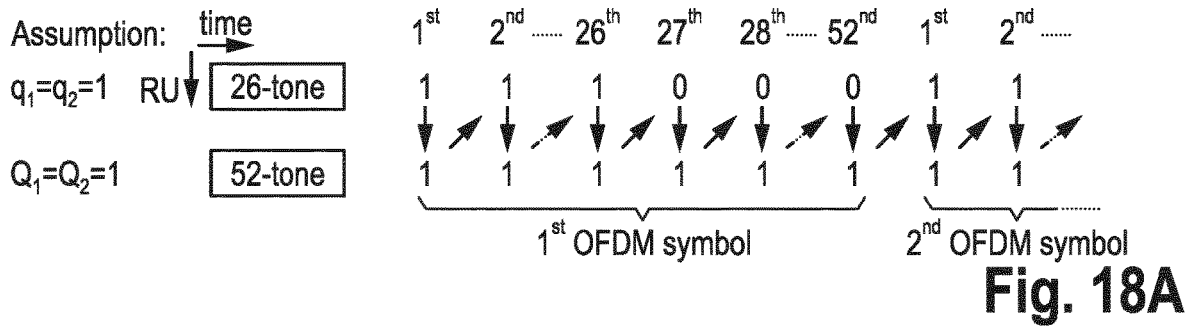
FIG. 18 shows two examples illustrating a second option for multi-RU allocation using RU size independent alternating bit allocation.
Figure 18B:
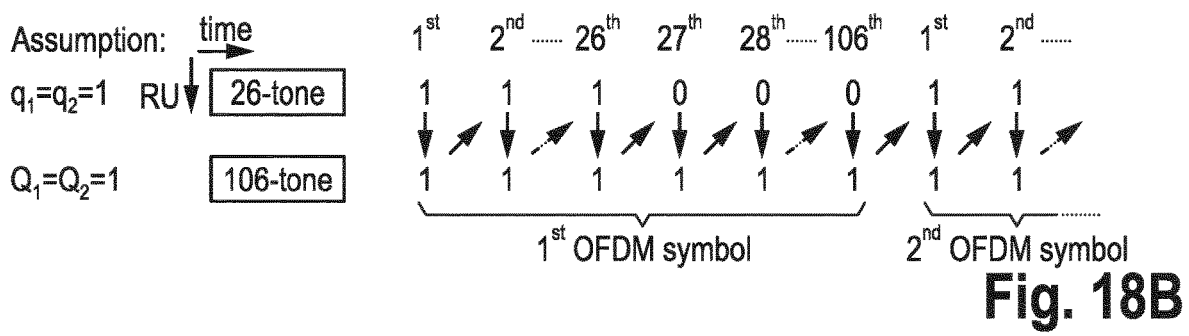

Examples illustrating the second option are shown in FIGS. 18A and 18B. In FIG. 18A, for instance, one cycle comprises a 52 alternations since in 52 alternations all bits are allocated to an OFDM symbol of the respective RU. As can be seen, the 26-tone RU is filled earlier than the 52-tone RU which causes $p_1(c)=0$ for $27 \leq c \leq 52$. In both examples the first ratio used for allocation of a first portion of the bits (i.e., the bits allocated in the alternations 1 to 26) allocated to the two resource units is 1:1 and the second ratio used for allocation of a second portion of the bits (i.e., the bits allocated in the alternations 27 to 52) allocated to the two resource units is 0:1.

According to a third option RU size dependent alternating bit allocation ($C_0 > 1$, $p_i(c) = p_i$) may be applied. In an implementation, the multi-RU parser 124 operates such that consecutive output bits of the LDPC encoder 122 are allocated alternating to the RUs. In contrast to the second option, the number of assigned bits per RU is proportional to its number of tones.

$$p_i(c) = p_i = Q_i \cdot \dfrac{N_i q_i}{\min_i \{N_i q_i\}}$$

This means that a large size RU gets more bits allocated per alternation compared to a small size RU. Prerequisite is that $$\frac{N_i q_i}{\min_i \{N_i q_i\}}$$

is an integer number and that all originate from same option with $Q_i \neq 1$. In this case all RUs of an OFDM symbol are filled at the same time after $$C_O = \min_i \left\{ \frac{N_i q_i}{Q_i} \right\}$$

alternations.

The third option achieves higher diversity than the second option in scenarios where a small size RU is combined with a large size RU, because a weak link quality small size RU can be compensated by a fair link quality large size RU. This is because the bits of small size RU are distributed over the entire OFDM symbol. In addition, each group of $Q_i$ weak bits of the small size RU is separated by various groups of $Q_i$ fair bits of the large size RU.

Figure 19:
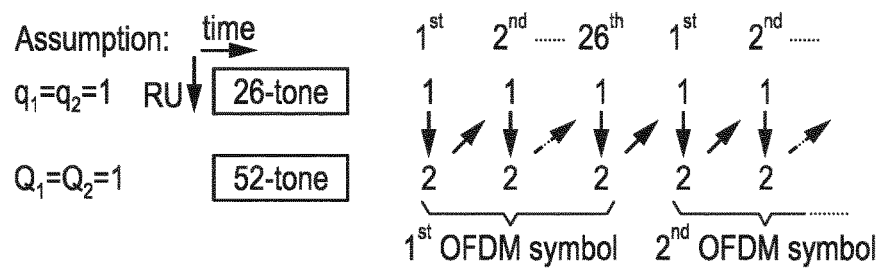
FIG. 19 shows an example illustrating a third option for multi-RU allocation using RU size dependent alternating bit allocation.

An example illustrating the second option is shown in FIG. 19. In FIG. 19 one cycle comprises a 26 alternations since in 26 alternations all bits are allocated to an OFDM symbol of the respective RU.

Figure 15:
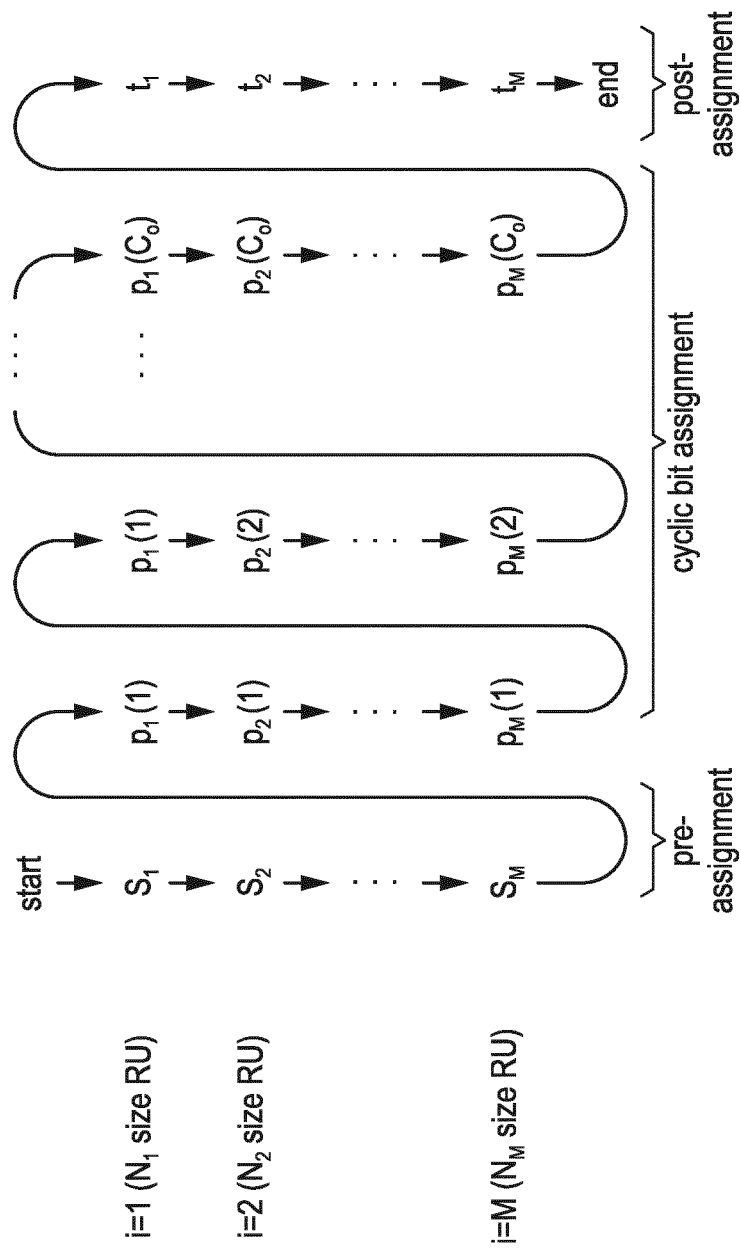
FIG. 15 shows a diagram illustrating RU size dependent bit assignment including non-alternating bit assignment.

According to a fourth option RU size dependent bit assignment including non-alternating bit assignment may be applied. In an implementation, the third option is applied together with pre- and post-bit assignment. The operation is shown in FIG. 15. The consecutive bits that are allocated in the pre-bit assignment before the alternating operation are labeled with $s_i$, whereas the consecutive bits that are allocated in the post-bit assignment after the alternating operation are labeled with $t_i$. Inbetween the pre- and post-bit assignment, alternating bit assignment as shown in FIG. 8 is performed. FIG. 15 shows the operation for a single OFDM symbol. Thus, if $s_i = t_i = 0$, the same behavior as before is achieved. The pre- and post-assignment can be flexibly applied, i.e. the post-assignment for example may be done in the middle of the alternating operation, i.e. after $C_O/2$ alternations. This may be important to avoid long bit allocations to single RU in case of OFDM symbol transitions.

Pre- and post-bit assignment may be used in case $p_i$ of the third option e.g. results in a non-integer number. In this case, $p_i$ is rounded to the closest integer number and the remaining bits that are missing to complete an OFDM symbol are computed.

$$r_i = N_i q_i - C_O p_i$$

Any $r_i \neq 0$ needs to be allocated before the next OFDM symbol starts. In WLAN case and for most other applicable communication systems, $r_i \geq 0$ holds. This is because larger RUs have more available tones per frequency unit than small RUs, hence the nominal spectral efficiency increases with RU size.

It is desirable to equally distribute $r_i$ bits either via pre- and post-bit assignment and/or via alternating bit assignment. Thus, several options exists to implement $r_i > 0$:

a) Allocate variable number of bits per cycle, i.e. $p_i(c)$;

b) Allocate constant number of bits per cycle and use non-alternating pre- and/or post-bit assignment, i.e. $p_i$ and $s_i = t_i \neq 0$;

c) Allocate variable number of bits per cycle and use non-alternating pre- and/or post-bit assignment, i.e. $p_i(c)$ and $s_i = t_i \neq 0$.

In case of $p_i(c)$ being variable, any $p_i(c)$ pattern may be envisioned as long as the total number of allocated bits does not change. In examples, it is assumed that the $p_i(c)$ pattern are sorted in descending order in sub-cycles.

In any case, it is desired that $s_i$ equals $t_i$ whenever possible. Thus, if the number of bits to be represented by pre- and post-bit assignment is an even integer, $s_i = t_i$ holds otherwise, $s_i = t_i + 1$ or $t_i = s_i + 1$ holds. The operation shown in FIG. 15 changes equations (1) to (4) as follows:

$$C = \frac{P}{\sum_{j=1}^{C_O} \sum_{i=1}^{M} p_i(c_j) + \sum_{i=1}^{M} s_i + t_i} \quad (1')$$

$$\sum_{j=1}^{C_O} \sum_{i=1}^{M} p_i(c_j) + \sum_{i=1}^{M} s_i + t_i = \sum_{i=1}^{M} q_i N_i \quad (2')$$

$$P_{pad} = \lceil N_{cycle} \rceil \cdot \left( \sum_{j=1}^{C_O} \sum_{i=1}^{M} p_i(c_j) + \sum_{i=1}^{M} s_i + t_i \right) - P_{LDPC} \quad (3')$$

$$N_{cycle} = \frac{P_{LDPC}}{\sum_{j=1}^{C_O} \sum_{i=1}^{M} p_i(c_j) + \sum_{i=1}^{M} s_i + t_i} \quad (4')$$

Examples illustrating the fourth option are shown in FIGS. 20A to 20D. In FIG. 20A, for instance, one cycle comprises a 26 alternations plus a pre-assignment and a post-assignment since in 26 alternations plus the pre-assignment and the post-assignment all bits are allocated to an OFDM symbol of the respective RU.

In the example of FIG. 20D, generally per alternation (of 242 alternations) 1 bit is allocated to the first RU and 4 bits are allocated to the second RU. Then, there are 28 remainder bits that still have to be allocated to the second RU. This is done such that in each of a pre-assignment and a post-assignment 3 bits are allocated to the second RU (i.e. six remainder bits in total) and that in each eleventh allocation (starting e.g. with the first allocation; each group of eleven consecutive alternations forming a sub-cycle one additional bit (i.e. 22 remainder bits in total) in addition to the regular four bits is allocated to the second RU (i.e. five bits per allocation).

In the example shown in FIG. 20A the first ratio used for allocation of a first portion of the bits (i.e., the bits allocated in the alternations 1 to 26) allocated to the two resource units is 1:4 and the second ratio used for allocation of a second portion of the bits (i.e., the bits allocated in the pre- and post-assignments) allocated to the two resource units is 0:1. In the example shown in FIG. 20B the first ratio used for allocation of a first portion of the bits (i.e., the bits allocated in the alternations 1 to 26) allocated to the two resource units is 1:4 and the second ratio used for allocation of a second portion of the bits (i.e., the bits allocated in the pre- and post-assignments) allocated to the two resource units is 1:5. In the example shown in FIG. 20C the first ratio used for allocation of a first portion of the bits (i.e., the bits allocated in the alternations 1 to 242) allocated to the two resource units is 1:4 and the second ratio used for allocation of a second portion of the bits (i.e., the bits allocated in the pre- and post-assignments) allocated to the two resource units is 0:14. In the example shown in FIG. 20D the first ratio used for allocation of a first portion of the bits (i.e., the bits allocated in the alternations 2 to 11, 13 to 22, etc.) allocated to the two resource units is 1:4, the second ratio used for allocation of a second portion of the bits (i.e., the bits allocated in the alternations 1, 12, 23, etc.) allocated to the two resource units is 1:5, and a third ratio used for allocation of a third portion of the bits (i.e., the bits allocated in the pre- and post-assignments) allocated to the two resource units is 0:3.

Generally, the behavior of the bit allocation to the cycles is such that, from cycle to cycle, the same number of bits is assigned to the corresponding alternations of the respective cycles. For instance, if in a first cycle, a cycle has 5 alternations, wherein 1 bit is assigned to RU1 and 2 bits are assigned to RU2 in each alternation, the subsequent cycles follow the same allocation of bits (e.g. in the second cycle there are also 5 alternations, wherein 1 bit is assigned to RU1 and 2 bits are assigned to RU2 in each alternation).

FIGS. 21A to 21D shows examples illustrating a fifth option for multi-RU allocation using different modulation orders. For instance, in the example shown in FIG. 21A QPSK (modulation order 2) is used for modulation of the bits allocated to the first RU (having 26 tones) and BPSK (modulation order 1) is used for modulation of the bits allocated to the second RU (having 52 tones). In this case, $Q_i$ (defining the minimum number of consecutive bits that are allocated per each alternation as a function of $q_i$) is selected according to the above-described case c), i.e. $Q_i=q_i$ bits per alternation, meaning that $Q_1=2$ and $Q_2=1$. Hence, for the first RU two bits are assigned to each tone and for the second RU one bit is assigned to each tone. Then, as described above with respect to the third option, per alternation (of 26 alternations of one cycle) two bits are allocated to the first RU and two bits are allocated to the second RU.

Figure 21A:
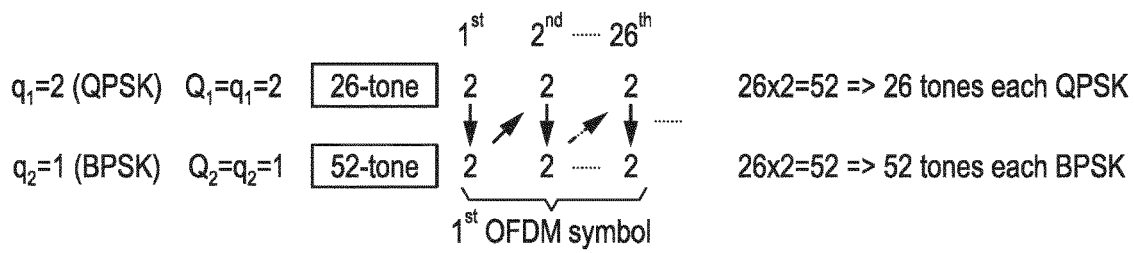
FIG. 21 shows four examples illustrating a fifth option for multi-RU allocation using different modulation orders.
Figure 21B:
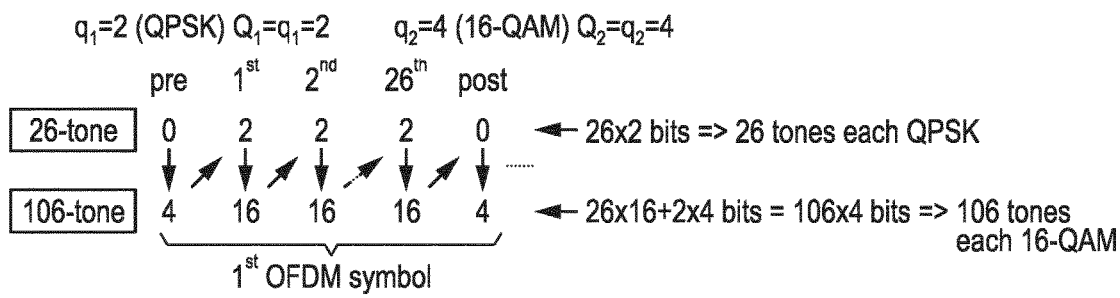

In the example shown in FIG. 21B QPSK (modulation order 2) is used for modulation of the bits allocated to the first RU (having 26 tones) and 16-QAM (modulation order 4) is used for modulation of the bits allocated to the second RU (having 106 tones). In this case, $Q_i$ is selected according to the above-described case c), i.e. $Q_i=q_i$ bits per alternation, meaning that $Q_1=2$ and $Q_2=4$. Hence, for the first RU two bits are assigned to each tone and for the second RU four bits are assigned to each tone. Then, per alternation (of 26 alternations) two bits are allocated to the first RU and sixteen bits are allocated to the second RU. The remainder of eight bits to be allocated to the second RU is assigned to a pre-assignment at the start of the cycle and to a post-assignment at the end of the cycle. In the example shown in FIG. 21B the first ratio used for allocation of a first portion of the bits (i.e., the bits allocated in the alternations 1 to 26) allocated to the two resource units is 2:16 and the second ratio used for allocation of a second portion of the bits (i.e., the bits allocated in the pre- and post-assignments) allocated to the two resource units is 0:4.

Figure 21C:
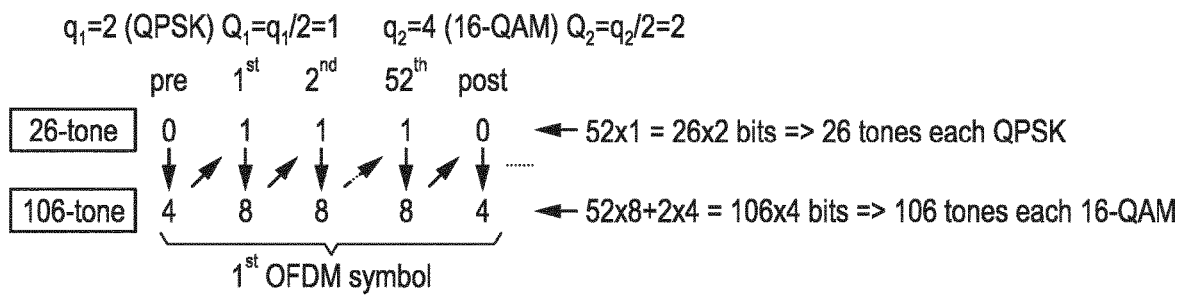

In the example shown in FIG. 21C QPSK (modulation order 2) is used for modulation of the bits allocated to the first RU (having 26 tones) and 16-QAM (modulation order 4) is used for modulation of the bits allocated to the second RU (having 106 tones). In this case, $Q_i$ is selected according to the above-described case b), i.e. $Q_i=\lfloor q_i/2 \rfloor$ bits per alternation, meaning that $Q_1=1$ and $Q_2=2$. Hence, for the first RU one bit is assigned to each tone and for the second RU eight bits are assigned to each tone. Then, per alternation (of 52 alternations) one bit is allocated to the first RU and eight bits are allocated to the second RU. The remainder of eight bits to be allocated to the second RU is assigned to a pre-assignment at the start of the cycle and to a post-assignment at the end of the cycle. In the example shown in FIG. 21C the first ratio used for allocation of a first portion of the bits (i.e., the bits allocated in the alternations 1 to 52) allocated to the two resource units is 1:8 and the second ratio used for allocation of a second portion of the bits (i.e., the bits allocated in the pre- and post-assignments) allocated to the two resource units is 0:4.

Figure 21D:
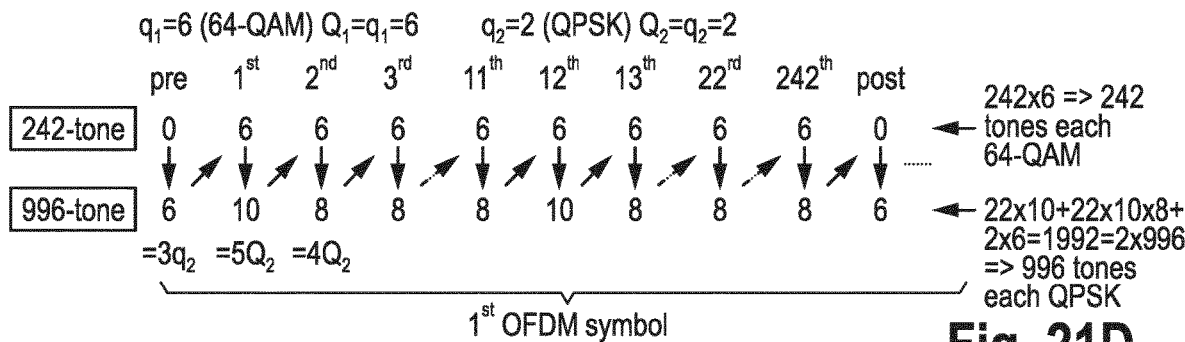

In the example shown in FIG. 21D 64-QAM (modulation order 6) is used for modulation of the bits allocated to the first RU (having 242 tones) and QPSK (modulation order 2) is used for modulation of the bits allocated to the second RU (having 996 tones). In this case, $Q_i$ is selected according to the above-described case b), i.e. $Q_i=q_i$ bits per alternation, meaning that $Q_1=6$ and $Q_2=2$. Hence, for the first RU six bits are assigned to each tone and for the second RU 8 bits are generally assigned to each tone. Then, per alternation (of most of the 242 alternations) 6 bits are allocated to the first RU and eight bits are allocated to the second RU. The remainder of 56 bits to be allocated to the second RU is allocated as follows: 6 bits are allocated to a pre-assignment at the start of the cycle, 6 bits are allocated to a post-assignment at the end of the cycle, and additional two bits are allocated to each first allocation of each sub-cycle comprising eleven alternations (i.e. to each eleventh alternation 10 bits instead of 8 bits are allocated). This option achieves higher diversity because the remaining bits are distributed over the entire OFDM symbol by the alternations 1, 12, 23, etc. This minimizes number of bits in pre- and post-assignment which is one of the optimization goals. In the example shown in FIG. 21D the first ratio used for allocation of a first portion of the bits (i.e., the bits allocated in the alternations 2 to 11, 13 to 22, etc.) allocated to the two resource units is 6:8, the second ratio used for allocation of a second portion of the bits (i.e., the bits allocated in the alternations 1, 12, 23, etc.) allocated to the two resource units is 6:10, and a third ratio used for allocation of a third portion of the bits (i.e., the bits allocated in the pre- and post-assignments) allocated to the two resource units is 0:6.

FIG. 16 shows Table 2 that gives examples for $p_i$, $s_i$, and $t_i$ for various combinations of RUs of Table 1 as well as for various options.

The order of RUs is exemplary and may change depending of the actual location of a RU within the frequency band as outlined above. The bit allocation sticks however to the particular RU size. The entries in Table 2 (FIG. 16) are valid under the following assumptions: Entries according to option 1 are always valid. Entries according to options 2, 3, and 4 are valid, when $Q_i$ is always selected from same option a), b), or c) for each RU. If selected according to option a), i.e. $Q_i=1$, $q_i=q_j$ for all $i \neq j$, i.e. all RUs have the same constellation mapping order, shall be additionally fulfilled. In the following some of the entries in Table 2 will be explained by way of examples.

For the type 26-tone RU+106-tone RU (according to row 6 of Table 2, with Q=q) the following bit allocations apply:
  Alternating bit allocation for 26-tone RU (starting from first alternation to 26th alternation): [1, 1, 1, 1, 1, 1, 1, 1, 1, 1, 1, 1, 1, 1, 1, 1, 1, 1, 1, 1, 1, 1, 1, 1, 1, 1] (this is $p_1(c)$ with c=1 . . . 26) times the modulation order of the 26-tone RU.
  Alternating bit allocation for 106-tone RU (starting from first alternation to 26th alternation): [4, 4, 4, 4, 4, 4, 4, 4, 4, 4, 4, 4, 4, 4, 4, 4, 4, 4, 4, 4, 4, 4, 4, 4, 4, 4] (this is $p_2(c)$ with c=1 . . . 26) times the modulation order of the 106-tone RU+1 (this is the $s_2$ or $t_2$; $s_2=t_2$ holds) times modulation order of the 106-tone RU for each pre- and post-assignment. $p_1(c)$ has always same length as $p_2(c)$. The succession is like [s1 (not present), s2, $p_1(c=1)$, $p_2(c=1)$, $p_1(c=2)$, $p_2(c=2)$, . . . , $p_1(c=26)$, $p_2(c=26)$, t1 (not present), t2].

For the type 26-tone RU+106-tone RU (according to row 6 of Table 2, with Q=q/2) the following bit allocations apply:

Alternating bit allocation for 26-tone RU (starting from first alternation to 52nd alternation): [1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1] times half the modulation order of the 26-tone RU.

Alternating bit allocation for 106-tone RU (starting from first alternation to 52nd alternation): [4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4] times half the modulation order of the 106-tone RU+1 times the modulation order (the pre- and post padding is always times the modulation order even in half modulation order (Q=q/2) case) of the 106-tone RU for each pre- and post-assignment.

For the type 26-tone RU+106-tone RU (according to row 6 of Table 2, with Q=1; the Q=1 case is basically different because of varying vector length and the need of the same modulation order for all RUs) the following bit allocations apply (in this case each RU must have same modulation order, i.e. $q_1=q_2=q$):

Alternating bit allocation for 26-tone RU (starting from first alternation to (26*q)-th alternation): [1, . . . , 1] vector of length (26*q).

Alternating bit allocation for 106-tone RU (starting from first alternation to (26*q)-th alternation): [4, . . . , 4] vector of length (26*q)+1 times q for each pre- and post-assignment.

For the type 26-tone RU+106-tone RU (according to row 7 of Table 2, with Q=q) the following bit allocations apply:

Alternating bit allocation for 26-tone RU (starting from first alternation to 26th alternation): [1, 1, 1, 1, 1, 1, 1, 1, 1, 1, 1, 1, 1, 1, 1, 1, 1, 1, 1, 1, 1, 1, 1, 1, 1, 1] times the modulation order of the 26-tone RU.

Alternating bit allocation for 106-tone RU (starting from first alternation to 26th alternation): [5, 4, 4, 4, 4, 4, 4, 4, 4, 4, 4, 4, 4, 4, 4, 4, 4, 4, 4, 4, 4, 4, 4, 4, 4, 5] times the modulation order of the 106-tone RU.

For the type 26-tone RU+106-tone RU (according to row 7 of Table 2, with Q=q/2) the following bit allocations apply:

Alternating bit allocation for 26-tone RU (starting from first alternation to 52nd alternation): [1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1] times half the modulation order of the 26-tone RU.

Alternating bit allocation for 106-tone RU (starting from first alternation to 52nd alternation): [6, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 6] times half the modulation order of the 106-tone RU.

For the type 26-tone RU+106-tone RU (according to row 7 of Table 2, with Q=1) the following bit allocations apply:

Alternating bit allocation for 26-tone RU (starting from first alternation to (26*q)-th alternation): [1, . . . , 1] vector of length (26*q).

Alternating bit allocation for 106-tone RU (starting from first alternation to (26*q)-th alternation): [4+q, 4, . . . , 4, 4+q] vector of length (26*q).

For the type 242-tone RU+996-tone RU (according to row 13 of Table 2, with Q=q) the following bit allocations apply:

Alternating bit allocation for 242-tone RU (starting from first alternation to 242nd alternation): [1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1] times the modulation order of the 242-tone RU.

Alternating bit allocation for 996-tone RU (starting from first alternation to 242nd alternation): [4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4] times the modulation order of the 996-tone RU+14 times the modulation order of the 996-tone RU for each pre- and post-assignment.

For the type 242-tone RU+996-tone RU (according to row 13 of Table 2, with Q=q/2) the following bit allocations apply:

Alternating bit allocation for 242-tone RU (starting from first alternation to 484th alternation): [1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1] times half the modulation order of the 242-tone RU.

Alternating bit allocation for 996-tone RU (starting from first alternation to 484th alternation): [4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4, 4, 4, 4, 4, 4,
4, 4, 4, 4, 4, 4, 4, 4, 4, 4, 4, 4, 4, 4, 4] times half the
modulation order of the 996-tone RU+14 times the
modulation order of the 996-tone RU for each pre- and
post-assignment.

For the type 242-tone RU+996-tone RU (according to row 13 of Table 2, with Q=1; in this case each RU must have same modulation order, i.e. $q_1=q_2=q$) the following bit allocations apply:

Alternating bit allocation for 242-tone RU (starting from first alternation to (242*q)-th alternation): [1, . . . , 1] vector of length (242*q).

Alternating bit allocation for 996-tone RU (starting from first alternation to (242*q)-th alternation): [4, . . . , 4] vector of length (242*q)+14 times q for each pre- and post-assignment.

For the type 242-tone RU+996-tone RU (according to row 14 of Table 2, with Q=q) the following bit allocations apply:

Alternating bit allocation for 242-tone RU (starting from first alternation to 242nd alternation): [1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1] times the modulation order of the 242-tone RU.

Alternating bit allocation for 996-tone RU (starting from first alternation to 242nd alternation): [5, 4, 4, 4, 4, 4,
4, 4, 4, 4, 4, 4, 5, 4, 4, 4, 4, 4, 4, 4, 4, 4, 4, 5, 4, 4, 4, 4, 4,
4, 4, 4, 4, 4, 4, 5, 4, 4, 4, 4, 4, 4, 4, 4, 4, 4, 5, 4, 4, 4,
4, 4, 4, 4, 4, 4, 5, 4, 4, 4, 4, 4, 4, 4, 4, 4, 4, 5, 4, 4,
4, 4, 4, 4, 4, 4, 4, 5, 4, 4, 4, 4, 4, 4, 4, 4, 4, 4, 5,
4, 4, 4, 4, 4, 4, 4, 4, 4, 4, 5, 4, 4, 4, 4, 4, 4, 4, 4, 4, 4,
5, 4, 4, 4, 4, 4, 4, 4, 4, 4, 4, 5, 4, 4, 4, 4, 4, 4, 4, 4, 4,
4, 5, 4, 4, 4, 4, 4, 4, 4, 4, 4, 4, 5, 4, 4, 4, 4, 4, 4, 4, 4,
4, 4, 5, 4, 4, 4, 4, 4, 4, 4, 4, 4, 4, 5, 4, 4, 4, 4, 4, 4, 4,
4, 4, 4, 5, 4, 4, 4, 4, 4, 4, 4, 4, 4, 4, 5, 4, 4, 4, 4, 4, 4,
4, 4, 4, 4, 5, 4, 4, 4, 4, 4, 4, 4, 4, 4, 4, 5, 4, 4, 4, 4, 4,
4, 4, 4, 4] times the modulation order of the 996-tone RU+3 times the modulation order of the 996-tone RU for each pre- and post-assignment.

For the type 242-tone RU+996-tone RU (according to row 14 of Table 2, with Q=q/2) the following bit allocations apply:

Alternating bit allocation for 242-tone RU (starting from first alternation to 484th alternation): [1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1] times half the modulation order of the 242-tone RU.

Alternating bit allocation for 996-tone RU (starting from first alternation to 484th alternation): [5, 4, 4, 4, 4, 4, 4,
4, 4, 4, 4, 5, 4, 4, 4, 4, 4, 4, 4, 4, 4, 4, 5, 4, 4, 4, 4, 4,
4, 4, 4, 4, 4, 5, 4, 4, 4, 4, 4, 4, 4, 4, 4, 4, 5, 4, 4, 4, 4,
4, 4, 4, 4, 4, 4, 5, 4, 4, 4, 4, 4, 4, 4, 4, 4, 4, 5, 4, 4,
4, 4, 4, 4, 4, 4, 5, 4, 4, 4, 4, 4, 4, 4, 4, 4, 4, 5, 4,
4, 4, 4, 4, 4, 4, 4, 4, 4, 5, 4, 4, 4, 4, 4, 4, 4, 4, 4, 5,
4, 4, 4, 4, 4, 4, 4, 4, 4, 4, 5, 4, 4, 4, 4, 4, 4, 4, 4, 4,
5, 4, 4, 4, 4, 4, 4, 4, 4, 4, 4, 5, 4, 4, 4, 4, 4, 4, 4, 4,
4, 5, 4, 4, 4, 4, 4, 4, 4, 4, 4, 4, 5, 4, 4, 4, 4, 4, 4, 4,
4, 4, 5, 4, 4, 4, 4, 4, 4, 4, 4, 4, 4, 5, 4, 4, 4, 4, 4, 4,
4, 4, 4, 5, 4, 4, 4, 4, 4, 4, 4, 4, 4, 4, 5, 4, 4, 4, 4, 4,
4, 4, 4, 4, 5, 4, 4, 4, 4, 4, 4, 4, 4, 4, 4, 5, 4, 4, 4, 4,
4, 4, 4, 4, 4, 5, 4, 4, 4, 4, 4, 4, 4, 4, 4, 4, 5, 4, 4, 4,
4, 4, 4, 4, 4, 4, 5, 4, 4, 4, 4, 4, 4, 4, 4, 4, 4, 5, 4, 4,
4, 4, 4, 4, 4, 4, 5, 4, 4, 4, 4, 4, 4, 4, 4, 4, 4, 5, 4, 4,
4, 4, 4, 4, 4, 4, 4, 5, 4, 4, 4, 4, 4, 4, 4, 4, 4, 4, 5,
4, 4, 4, 4, 4, 4, 4, 4, 4, 5, 4, 4, 4, 4, 4, 4, 4, 4, 4, 4,
5, 4, 4, 4, 4, 4, 4, 4, 4, 4, 5, 4, 4, 4, 4, 4, 4, 4, 4, 4,
4, 5, 4, 4, 4, 4, 4, 4, 4, 4, 4, 5, 4, 4, 4, 4, 4, 4, 4, 4,
4, 4, 5, 4, 4, 4, 4, 4, 4, 4, 4, 4, 4, 4] times half the modulation order of the 996-tone RU+3 times the modulation order of the 996-tone RU for each pre- and post-assignment.

For the type 242-tone RU+996-tone RU (according to row 14 of Table 2, with Q=1; in this case each RU must have same modulation order, i.e. $q_1=q_2=q$) the following bit allocations apply:

Alternating bit allocation for 242-tone RU (starting from first alternation to (242*q)-th alternation): [1, . . . , 1] vector of length (242*q).

Alternating bit allocation for 996-tone RU (starting from first alternation to (242*q)-th alternation): [5, 4, 4, 4, 4, 4, 4, 4, 4, 4, 4, . . . , 5, 4, 4, 4, 4, 4, 4, 4, 4, 4, 4] vector of length (242*q)+3 times q for each pre- and post-assignment. The pattern [5, 4, 4, 4, 4, 4, 4, 4, 4, 4, 4] repeats 22*q times.

For the type 484-tone RU+996-tone RU (according to row 17 of Table 2, with Q=q) the following bit allocations apply:

Alternating bit allocation for 242-tone RU (starting from first alternation to 484th alternation): [1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1] times the modulation order of the 484-tone RU.

Alternating bit allocation for 996-tone RU (starting from first alternation to 484th alternation): [2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2] times the modulation order of the 996-tone RU+14 times the modulation order of the 996-tone RU for each pre- and post-assignment.

For the type 484-tone RU+996-tone RU (according to row 17 of Table 2, with Q=q/2) the following bit allocations apply:

Alternating bit allocation for 242-tone RU (starting from first alternation to 968th alternation): [1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1] times half the modulation order of the 484-tone RU.

Alternating bit allocation for 996-tone RU (starting from first alternation to 968th alternation): [2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2] times half the modulation order of the 996-tone RU+14 times the modulation order of the 996-tone RU for each pre- and post-assignment.

For the type 484-tone RU+996-tone RU (according to row 17 of Table 2, with Q=1; in this case each RU must have same modulation order, i.e. $q_1=q_2=q$) the following bit allocations apply:

Alternating bit allocation for 242-tone RU (starting from first alternation to (484*q)-th alternation): [1, . . . , 1] vector of length (484*q).

Alternating bit allocation for 996-tone RU (starting from first alternation to (484*q)-th alternation): [2, . . . , 2] vector of length (484*q)+14 times q for each pre- and post-assignment.

For the type 484-tone RU+996-tone RU (according to row 18 of Table 2, with Q=q) the following bit allocations apply:

Alternating bit allocation for 242-tone RU (starting from first alternation to 484th alternation): [1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1] times the modulation order of the 484-tone RU.

Alternating bit allocation for 996-tone RU (starting from first alternation to 484th alternation): [3, 2, 2, 2, 2, 2, 2,
2, 2, 2, 2, 3, 2, 2, 2, 2, 2, 2, 2, 2, 2, 3, 2, 2, 2, 2, 2,
2, 2, 2, 2, 2, 3, 2, 2, 2, 2, 2, 2, 2, 2, 2, 3, 2, 2, 2, 2,
2, 2, 2, 2, 2, 2, 3, 2, 2, 2, 2, 2, 2, 2, 2, 2, 3, 2, 2, 2,
2, 2, 2, 2, 2, 2, 2, 3, 2, 2, 2, 2, 2, 2, 2, 2, 2, 3, 2, 2,
2, 2, 2, 2, 2, 2, 2, 2, 3, 2, 2, 2, 2, 2, 2, 2, 2, 2, 3,
2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2,
2, 3, 2, 2, 2, 2, 2, 2, 2, 2, 2, 3, 2, 2, 2, 2, 2, 2, 2, 2,
2, 2, 3, 2, 2, 2, 2, 2, 2, 2, 2, 2, 3, 2, 2, 2, 2, 2, 2, 2,
2, 2, 2, 3, 2, 2, 2, 2, 2, 2, 2, 2, 2, 3, 2, 2, 2, 2, 2, 2,
2, 2, 2, 2, 3, 2, 2, 2, 2, 2, 2, 2, 2, 2, 3, 2, 2, 2, 2, 2,
2, 2, 2, 2, 2, 3, 2, 2, 2, 2, 2, 2, 2, 2, 2, 3, 2, 2, 2, 2,
2, 2, 2, 2, 2, 2, 3, 2, 2, 2, 2, 2, 2, 2, 2, 2, 3, 2, 2, 2,
2, 2, 2, 2, 2, 2, 2, 3, 2, 2, 2, 2, 2, 2, 2, 2, 2, 3, 2, 2,
2, 2, 2, 2, 2, 2, 2, 2, 3, 2, 2, 2, 2, 2, 2, 2, 2, 2, 3, 2,
2, 2, 2, 2, 2, 2, 2, 2, 2, 3, 2, 2, 2, 2, 2, 2, 2, 2, 2, 3,
2, 2, 2, 2, 2, 2, 2, 2, 2, 2, 3, 2, 2, 2, 2, 2, 2, 2, 2, 3,
2, 2, 2, 2, 2, 2, 2, 2, 2, 3, 2, 2, 2, 2, 2, 2, 2, 2, 2, 2,
3, 2, 2, 2, 2, 2, 2, 2, 2, 3, 2, 2, 2, 2, 2, 2, 2, 2, 2, 2,
2, 3, 2, 2, 2, 2, 2, 2, 2, 2, 3, 2, 2, 2, 2, 2, 2, 2, 2, 2,
2, 2, 3, 2, 2, 2, 2, 2, 2, 2, 2, 3, 2, 2, 2, 2, 2, 2, 2, 2,
2, 2, 2, 3, 2, 2, 2, 2, 2, 2, 2, 2, 3, 2, 2, 2, 2, 2, 2, 2,
2, 2, 2, 2, 3, 2, 2, 2, 2, 2, 2, 2, 2, 2] times the modulation order of the 996-tone RU+3 times the modulation order of the 996-tone RU for each pre- and post-assignment.

For the type 484-tone RU+996-tone RU (according to row 18 of Table 2, with Q=q/2) the following bit allocations apply:

Alternating bit allocation for 242-tone RU (starting from first alternation to 968th alternation): [1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1] times half the modulation order of the 484-tone RU.

Alternating bit allocation for 996-tone RU (starting from first alternation to 968th alternation): [3, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 3, 2, 2, 2, 2, 2, 2, 2, 2, 2, 2, 2, 3, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 3, 2, 2, 2, 2, 2, 2, 2, 2, 2, 2, 2, 3, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 3, 2, 2, 2, 2, 2, 2, 2, 2, 2, 2, 2, 2, 2, 2, 3, 2, 2, 2, 2, 2, 2, 2, 2, 2, 2, 2, 2, 2] times half the modulation order of the 996-tone RU+3 times the modulation order of the 996-tone RU for each pre- and post-assignment.

For the type 484-tone RU+996-tone RU (according to row 18 of Table 2, with Q=1; in this case each RU must have same modulation order, i.e. $q_1=q_2=q$) the following bit allocations apply:

Alternating bit allocation for 242-tone RU (starting from first alternation to (484*q)-th alternation): [1, . . . , 1] vector of length (484*q).

Alternating bit allocation for 996-tone RU (starting from first alternation to (484*q)-th alternation): [3, 2, 2, 2, 2, 2, 2, 2, 2, 2, 2, . . . , 3, 2, 2, 2, 2, 2, 2, 2, 2, 2, 2] vector of length (484*q)+3 times q for each pre- and post-assignment. The pattern [3, 2, 2, 2, 2, 2, 2, 2, 2, 2, 2] repeats 44*q times.

The present disclosure provides the advantages that the bit parser operation for allocation of multiple resource units to a single user achieves high diversity with the error correction codes, e.g. LDPC codes, and constellation diagrams provided e.g. by IEEE 802.11 WLAN standard. Further, in requires a bit parser operation with low memory requirements that simplifies implementation and enables low latency decoding. Still further, optional bit padding can be adapted to the needs for the multi-RU bit parser operation Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits or circuitry. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors which are programmed or configured according to software code. A circuit does not include pure software, although a circuit includes the above-described hardware executing software. A circuit or circuitry may be implemented by a single device or unit or multiple devices or units, or chipset(s), or processor(s).

It follows a list of further embodiments of the disclosed subject matter:

1. First communication device configured to communicate with a second communication device, the first communication device comprising circuitry configured to
   encode data words of an input bit stream to be transmitted to the second communication device into code words of an encoded bit stream;

allocate the bits of the encoded bit stream to two or more resource units assigned to the second communication device and covering different subsections of a channel bandwidth,
wherein at least two of the two or more resource units cover subsections having a different number of tones,
wherein a number of bits of the encoded bit stream allocated to a resource unit is proportional to the number of tones of the subsection covered by the resource unit,
wherein the bits to be allocated to the two or more resource units are alternately allocated to the two or more resource units in a cycle having two or more alternations,
wherein, for a first portion of the bits to be allocated to the two or more resource units in one cycle, a first ratio of the predetermined numbers of consecutive bits alternately allocated to two resource units is based on the number of tones of subsections covered by said two resource units and the modulation order of a modulation of the bits allocated to the respective resource unit, and
wherein, for a second portion of the bits to be allocated to two or more resource units in one cycle, a second ratio of the predetermined numbers of consecutive bits alternately allocated to two resource units is different from the first ratio,
groupwise map, per resource unit, bits of the encoded bit stream allocated to the respective resource unit to symbols of a constellation, and
assign the resource units to the respective subsection of the channel bandwidth in the frequency domain.

2. First communication device as defined in any preceding embodiment,
wherein the first ratio corresponds to the integer part of the ratio of a first product to a second product, the first product being formed by multiplying the number of tones of the subsections covered by a first of said two or more resource units with the modulation order of a modulation of the bits allocated to the first resource unit and the second product being formed by multiplying the number of tones of the subsections covered by a second of said two or more resource units with the modulation order of a modulation of the bits allocated to the second resource unit, wherein the first product is equal to or larger than the second product.

3. First communication device as defined in embodiment 2,
wherein the second ratio is formed by a remainder of bits that are not allocated to the two or more resource units as first portion of bits and/or as second portion of bits according to the first ratio.

4. First communication device as defined in embodiment claim 3,
wherein the circuitry is configured to allocate the remainder of bits to the respective resource unit as additional bits in addition to the predetermined number of bits in one or more alternations of a cycle and/or as pre- and/or post-bits in a pre-assignment and/or post-assignment at the start and/or end of a cycle.

5. First communication device as defined in any preceding embodiment,
wherein the circuitry is further configured to allocate the bits of the encoded bit stream to the two or more resource units in one cycle such that all resource units are filled with bits at the same time.

6. First communication device as defined in any preceding embodiment,
wherein each ratio of the number of tones of subsections covered by each pair of resource units of the two or more resource units is an integer number.

7. First communication device as defined in any preceding embodiment,
wherein at least one ratio of the number of tones of subsections covered by a pair of resource units of the two or more resource units is a non-integer number,
wherein the circuitry is further configured to allocate a remainder of bits that are not allocated to the two or more resource units as first portion of bits and/or as second portion of bits according to the first ratio either as additional bits in addition to the predetermined number of bits in the first and/or last alternation of a cycle or as pre- and/or post-bits in a pre-assignment and/or post-assignment at the start and/or end of a cycle.

8. First communication device as defined in any one of embodiments 4 to 7,
wherein the circuitry is further configured to allocate the same number of pre-bits and post-bits in the pre-assignment and the post-assignment.

9. First communication device as defined in any one of embodiments 4 to 8,
wherein the circuitry is further configured to allocate the same number of additional bits in the first alternation, and/or the last alternation of a cycle and/or in one or more other predetermined alternations of a cycle.

10. First communication device as defined in any preceding embodiment,
wherein a first resource unit covers a subsection having 26 tones and a second resource unit covers a subsection having 52 tones, or
wherein a first resource unit covers a subsection having 26 tones and a second resource unit covers a subsection having 106 tones, or
wherein a first resource unit covers a subsection having 242 tones and a second resource unit covers a subsection having 484 tones, or
wherein a first resource unit covers a subsection having 242 tones and a second resource unit covers a subsection having 996 tones, or
wherein a first resource unit covers a subsection having 484 tones and a second resource unit covers a subsection having 996 tones, or
wherein a first resource unit covers a subsection having 242 tones, a second resource unit covers a subsection having 996 tones, and a third resource unit covers a subsection having 484 tones.

11. First communication device as defined in any preceding embodiment,
wherein the circuitry is further configured to generate signaling information for transmission to the second communication device, the signaling information indicating
which resource units are assigned to the second communication device and/or
the sizes and/or subsections of the channel bandwidth are covered by the resource units, and/or
how the bits of the encoded bit stream are allocated to two or more resource units.

12. First communication device as defined in any preceding embodiment,
wherein the circuitry is further configured to add bits to the encoded bit stream before allocating the bits to two or more resource units to achieve a predetermined length of the encoded bit stream.

13. First communication device as defined in any preceding embodiment,
wherein the circuitry is further configured to interleave the symbols, per resource unit, over the tones of the subsection covered by the respective subsection or to interleave the symbols, across the two or more resource units, over the tones of the subsections covered by the two or more resource units.

14. First communication device as defined in any preceding embodiment,
wherein the predetermined number of consecutive bits is an integer multiple of the number of bits per group of bits groupwise mapped to symbols of a constellation or half the number of bits per group of bits groupwise mapped to symbols of a constellation.

15. First communication device as defined in any preceding embodiment,
wherein the circuitry is further configured to conduct the post-assignment and/or last alternation at any time during a cycle after a completed alternation.

16. Second communication device configured to communicate with a first communication device, the second communication device comprising circuitry configured to
   extract, from a received signal in the frequency domain, tones of different subsections of a channel bandwidth that are covered by two or more resource units assigned to the second communication device, wherein at least two of the two or more resource units cover subsections having a different number of tones,
   groupwise demap, per resource unit, bits of an encoded bit stream allocated to the respective resource unit from symbols of a constellation,
   retrieve from two or more resource units the bits of the encoded bit stream,
   wherein a number of bits of the encoded bit stream allocated to a resource unit corresponds to the number of tones of the subsection covered by the resource unit,
   wherein the bits allocated to the two or more resource units in one cycle are alternately retrieved from the two or more resource units in two or more alternations,
   wherein, for a first portion of the bits allocated to the two or more resource units in one cycle, a first ratio of the predetermined numbers of consecutive bits alternately retrieved from two resource units is based on the number of tones of subsections covered by said two resource units and the modulation order of a modulation of the bits allocated to the respective resource unit, and
   wherein, for a second portion of the bits allocated to two or more resource units in one cycle, a second ratio of the predetermined numbers of consecutive bits alternately retrieved from two resource units is different from the first ratio,
   decode code words of the encoded bit stream into data words of an output bit stream.

17. Second communication device as defined in embodiment 16,
wherein the circuitry is further configured to determine which resource units are assigned to the second communication device from signaling information received from the first communication device.

18. First communication method configured to communicate with a second communication device, the first communication method comprising
   encoding data words of an input bit stream to be transmitted to the second communication device into code words of an encoded bit stream;
   allocating the bits of the encoded bit stream to two or more resource units assigned to the second communication device and covering different subsections of a channel bandwidth,
   wherein at least two of the two or more resource units cover subsections having a different number of tones,
   wherein a number of bits of the encoded bit stream allocated to a resource unit is proportional to the number of tones of the subsection covered by the resource unit,
   wherein the bits to be allocated to the two or more resource units are alternately allocated to the two or more resource units in a cycle having two or more alternations,
   wherein, for a first portion of the bits to be allocated to the two or more resource units in one cycle, a first ratio of the predetermined numbers of consecutive bits alternately allocated to two resource units is based on the number of tones of subsections covered by said two resource units and the modulation order of a modulation of the bits allocated to the respective resource unit, and
   wherein, for a second portion of the bits to be allocated to two or more resource units in one cycle, a second ratio of the predetermined numbers of consecutive bits alternately allocated to two resource units is different from the first ratio,
   groupwise mapping, per resource unit, bits of the encoded bit stream allocated to the respective resource unit to symbols of a constellation; and
   assigning the resource units to the respective subsection of the channel bandwidth in the frequency domain.

19. Second communication method configured to communicate with a first communication device, the second communication method comprising
   extracting, from a received signal in the frequency domain, tones of different subsections of a channel bandwidth that are covered by two or more resource units assigned to the second communication device, wherein at least two of the two or more resource units cover subsections having a different number of tones;
   groupwise demapping, per resource unit, bits of an encoded bit stream allocated to the respective resource unit from symbols of a constellation;
   retrieving from two or more resource units the bits of the encoded bit stream,
   wherein a number of bits of the encoded bit stream allocated to a resource unit corresponds to the number of tones of the subsection covered by the resource unit,
   wherein the bits allocated to the two or more resource units in one cycle are alternately retrieved from the two or more resource units in two or more alternations,
   wherein, for a first portion of the bits allocated to the two or more resource units in one cycle, a first ratio of the predetermined numbers of consecutive bits alternately retrieved from two resource units is based on the number of tones of subsections covered by said two resource units and the modulation order of a modulation of the bits allocated to the respective resource unit, and wherein, for a second portion of the bits allocated to two or more resource units in one cycle, a second ratio of the predetermined numbers of consecutive bits alternately retrieved from two resource units is different from the first ratio, decoding code words of the encoded bit stream into data words of an output bit stream.

20. A non-transitory computer-readable recording medium that stores therein a computer program product, which, when executed by a processor, causes the method according to embodiments 18 or 19 to be performed.

21. First communication device as defined in any one of embodiments 1 to 16, wherein the resource unit covering subsections with lowest frequency within the two or more resource units is considered to be the first resource unit.

22. First communication device as defined in any one of embodiments 1 to 16, wherein the resource units of an OFDM symbol are filled after one cycle including potential pre- and/or post-assignment.

23. First communication device as defined in any one of embodiments 1 to 16, wherein the circuitry is configured to allocate, from cycle to cycle, the same number of bits to the corresponding alternations of the respective cycles.

24. First or second communication device or method as defined in any one of the preceding embodiments, wherein the circuitry or method is configured to allocate the bits to the resource units according to one of the examples described in table 2.

25. First or second communication device or method as defined in any one of the preceding embodiments, wherein a first resource unit has 26 tones and a second resource unit has 106 tones and wherein one of the following bit allocations apply:

a) Alternating bit allocation for 26-tone resource unit (starting from first alternation to 26th alternation): [1, 1, 1, 1, 1, 1, 1, 1, 1, 1, 1, 1, 1, 1, 1, 1, 1, 1, 1, 1, 1, 1, 1, 1, 1, 1] times the modulation order of the 26-tone resource unit, and Alternating bit allocation for 106-tone resource unit (starting from first alternation to 26th alternation): [5, 4, 4, 4, 4, 4, 4, 4, 4, 4, 4, 4, 4, 4, 4, 4, 4, 4, 4, 4, 4, 4, 4, 4, 4, 5] times the modulation order of the 106-tone resource unit;

b) Alternating bit allocation for 26-tone resource unit (starting from first alternation to 52nd alternation): [1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1] times half the modulation order of the 26-tone resource unit, and Alternating bit allocation for 106-tone resource unit (starting from first alternation to 52nd alternation): [6, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 4, 6] times half the modulation order of the 106-tone resource unit;

c) Alternating bit allocation for 26-tone resource unit (starting from first alternation to (26*q)-th alternation): [1, . . . , 1] vector of length (26*q), and Alternating bit allocation for 106-tone resource unit (starting from first alternation to (26*q)th alternation): [4+q, 4, . . . , 4, 4+q] vector of length (26*q);

wherein q represents the number of bits mapped to a symbol of the constellation.

26. First or second communication device or method as defined in any one of the embodiments 1 to 24, wherein a first resource unit has 242 tones and a second resource unit has 996 tones and wherein one of the following bit allocations apply:

a) Alternating bit allocation for 242-tone resource unit (starting from first alternation to 242nd alternation): [1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1] times the modulation order of the 242-tone resource unit, and Alternating bit allocation for 996-tone resource unit (starting from first alternation to 242nd alternation): [5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4] times the modulation order of the 996-tone resource unit+3 times the modulation order of the 996-tone resource unit for each pre- and post-assignment; b) Alternating bit allocation for 242-tone resource unit (starting from first alternation to 484th alternation): [1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1] times half the modulation order of the 242-tone resource unit, and Alternating bit allocation for 996-tone resource unit (starting from first alternation to 484th alternation): [5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 4] times half the modulation order of the 996-tone resource unit+3 times the modulation order of the 996-tone resource unit for each pre- and post-assignment;

c) Alternating bit allocation for 242-tone resource unit (starting from first alternation to (242*q)-th alternation): [1, . . . , 1] vector of length (242*q), and Alternating bit allocation for 996-tone resource unit (starting from first alternation to (242*q)-th alternation): [5, 4, 4, 4, 4, 4, 4, 4, 4, 4, . . . , 5, 4, 4, 4, 4, 4, 4, 4, 4, 4] vector of length (242*q)+3 times q for each pre- and post-assignment. The pattern [5, 4, 4, 4, 4, 4, 4, 4, 4, 4] repeats 22*q times;

wherein q represents the number of bits mapped to a symbol of the constellation.

27. First or second communication device or method as defined in any one of the embodiments 1 to 24, wherein a first resource unit has 484 tones and a second resource unit has 996 tones and wherein one of the following bit allocations apply:

a) Alternating bit allocation for 484-tone resource unit (starting from first alternation to 484th alternation): [1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1] times the modulation order of the 484-tone resource unit, and Alternating bit allocation for 996-tone resource unit (starting from first alternation to 484th alternation): [3, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 2] times the modulation order of the 996-tone resource unit+3 times the modulation order of the 996-tone resource unit for each pre- and post-assignment;

b) Alternating bit allocation for 484-tone resource unit (starting from first alternation to 968th alternation): [1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1] times half the modulation order of the 484-tone resource unit, and Alternating bit allocation for 996-tone resource unit (starting from first alternation to 968th alternation): [3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 3, 2, 2, 2, 2, 2, 2, 2, 2, 2, 2] times half the modulation order of the 996-tone resource unit+3 times the modulation order of the 996-tone resource unit for each pre- and post-assignment;

c) Alternating bit allocation for 242-tone resource unit (starting from first alternation to (484*q)-th alternation): [1, ..., 1] vector of length (484*q), and Alternating bit allocation for 996-tone resource unit (starting from first alternation to (484*q)-th alternation): [3, 2, 2, 2, 2, 2, 2, 2, 2, 2, 2, ..., 3, 2, 2, 2, 2, 2, 2, 2, 2, 2, 2] vector of length (484*q)+3 times q for each pre- and post-assignment. The pattern [3, 2, 2, 2, 2, 2, 2, 2, 2, 2, 2] repeats 44*q times;

wherein q represents the number of bits mapped to a symbol of the constellation.

28. First or second communication device or method as defined in any one of the embodiments 1 to 24, wherein a first resource unit has 242 tones, a second resource unit has 996 tones and a third resource unit has 484 tones and wherein one of the following bit allocations apply:

a) Alternating bit allocation for 242-tone resource unit (starting from first alternation to 242nd alternation): [1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1] times the modulation order of the 242-tone resource unit, and Alternating bit allocation for 996-tone resource unit (starting from first alternation to 242nd alternation): [5, 4, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 5, 4, 4, 4, 4, 4, 4, 4, 4, 4, 5, 4, 4, 4, 4, 4, 4, 4, 4, 4, 4, 4] times the modulation order of the 996-tone resource unit+3 times the modulation order of the 996-tone resource unit for each pre- and post-assignment, and Alternating bit allocation for 484-tone resource unit (starting from first alternation to 242nd alternation): [2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2, 2] times the modulation order of the 484-tone resource unit; b) Alternating bit allocation for 242-tone resource unit (starting from first alternation to 484th alternation): [1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1,
1, 1, 1, 1, 1, 1, 1] times half the modulation order of
the 242-tone resource unit, and Alternating bit allocation for 996-tone resource unit (starting from first alternation to 484th alternation): [5, 4, 4,
4, 4, 4, 4, 4, 4, 4, 4, 5, 4, 4, 4, 4, 4, 4, 4, 4, 4, 5, 4,
4, 4, 4, 4, 4, 4, 4, 4, 4, 5, 4, 4, 4, 4, 4, 4, 4, 4, 4, 5,
4, 4, 4, 4, 4, 4, 4, 4, 4, 5, 4, 4, 4, 4, 4, 4, 4, 4, 4,
5, 4, 4, 4, 4, 4, 4, 4, 4, 4, 5, 4, 4, 4, 4, 4, 4, 4, 4,
4, 5, 4, 4, 4, 4, 4, 4, 4, 4, 4, 5, 4, 4, 4, 4, 4, 4, 4,
4, 4, 5, 4, 4, 4, 4, 4, 4, 4, 4, 4, 5, 4, 4, 4, 4, 4, 4,
4, 4, 4, 5, 4, 4, 4, 4, 4, 4, 4, 4, 4, 5, 4, 4, 4, 4, 4,
4, 4, 4, 4, 5, 4, 4, 4, 4, 4, 4, 4, 4, 4, 5, 4, 4, 4, 4,
4, 4, 4, 4, 4, 5, 4, 4, 4, 4, 4, 4, 4, 4, 4, 5, 4, 4, 4,
4, 4, 4, 4, 4, 4, 5, 4, 4, 4, 4, 4, 4, 4, 4, 4, 5, 4, 4,
4, 4, 4, 4, 4, 4, 4, 5, 4, 4, 4, 4, 4, 4, 4, 4, 4, 5, 4,
5, 4, 4, 4, 4, 4, 4, 4, 4, 4, 5, 4, 4, 4, 4, 4, 4, 4, 4,
4, 5, 4, 4, 4, 4, 4, 4, 4, 4, 4, 5, 4, 4, 4, 4, 4, 4, 4,
4, 4, 5, 4, 4, 4, 4, 4, 4, 4, 4, 4, 5, 4, 4, 4, 4, 4, 4,
4, 4, 4, 5, 4, 4, 4, 4, 4, 4, 4, 4, 4, 5, 4, 4, 4, 4, 4,
4, 4, 4, 4, 5, 4, 4, 4, 4, 4, 4, 4, 4, 4, 5, 4, 4, 4, 4,
4, 4, 4, 4, 4, 5, 4, 4, 4, 4, 4, 4, 4, 4, 4, 5, 4, 4, 4,
4, 4, 4, 4, 4, 4, 5, 4, 4, 4, 4, 4, 4, 4, 4, 4, 5, 4, 4,
4, 4, 4, 4, 4, 4, 4, 5, 4, 4, 4, 4, 4, 4, 4, 4, 4, 4] times
half the modulation order of the 996-tone resource
unit+3 times the modulation order of the 996-tone
resource unit for each pre- and post-assignment, and Alternating bit allocation for 484-tone resource unit (starting from first alternation to 484th alternation): [2, 2, 2,
2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2, 2, 2] times
half the modulation order of the 484-tone resource unit;

c) Alternating bit allocation for 242-tone resource unit (starting from first alternation to $(242*q)$-th alternation): $[1, \ldots, 1]$ vector of length $(242*q)$, and Alternating bit allocation for 996-tone resource unit (starting from first alternation to $(242*q)$-th alternation): [5, 4, 4, 4, 4, 4, 4, 4, 4, 4, 4, ..., 5, 4, 4, 4, 4, 4, 4, 4, 4, 4, 4] vector of length $(242*q)+3$ times q for each pre- and post-assignment. The pattern [5, 4, 4, 4, 4, 4, 4, 4, 4, 4, 4] repeats $22*q$ times, and Alternating bit allocation for 484-tone resource unit (starting from first alternation to $(242*q)$-th alternation): $[2, \ldots, 2]$ vector of length $(242*q)$;

wherein q represents the number of bits mapped to a symbol of the constellation.

29. A computer program comprising program code means for causing a computer to perform the steps of said method according to embodiment 18 or 19 when said computer program is carried out on a computer.

The invention claimed is:

1. First communication device configured to communicate with a second communication device, the first communication device comprising:
   circuitry configured to
      encode data words of an input bit stream to be transmitted to the second communication device into code words of an encoded bit stream;
      allocate the bits of the encoded bit stream to two or more resource units assigned to the second communication device and covering different subsections of a channel bandwidth,
   wherein at least two of the two or more resource units cover subsections having a different number of tones,
   wherein a number of bits of the encoded bit stream allocated to a resource unit is proportional to the number of tones of the subsection covered by the resource unit,
   wherein the bits to be allocated to the two or more resource units are alternately allocated to the two or more resource units in a cycle having two or more alternations,
   wherein, for a first portion of the bits to be allocated to the two or more resource units in one cycle, a first ratio of predetermined numbers of consecutive bits alternately allocated to two resource units is based on the number of tones of subsections covered by said two resource units, and
   wherein, for a second portion of the bits to be allocated to the two or more resource units in one cycle, a second ratio of predetermined numbers of consecutive bits alternately allocated to two resource units is different from the first ratio, wherein the second ratio is formed by a remainder of bits that are not allocated to the two or more resource units as first portion of bits according to the first ratio;

groupwise map, per resource unit, bits of the encoded bit stream allocated to the respective resource unit to symbols of a constellation; and assign the resource units to the respective subsection of the channel bandwidth in the frequency domain.

2. The first communication device as claimed in claim 1, wherein the first ratio corresponds to the integer part of the ratio of a first product to a second product, the first product being formed by multiplying the number of tones of the subsections covered by a first of said two or more resource units with a modulation order of a modulation of the bits allocated to the first resource unit and the second product being formed by multiplying the number of tones of the subsections covered by a second of said two or more resource units with a modulation order of a modulation of the bits allocated to the second resource unit, wherein the first product is equal to or larger than the second product.

3. The first communication device as claimed in claim 1, wherein the circuitry is configured to allocate the remainder of bits to the respective resource unit as additional bits in addition to the predetermined number of bits in one or more alternations of a cycle and/or as pre- and/or post-bits in a pre-assignment and/or post-assignment at the start and/or end of a cycle.

4. The first communication device as claimed in claim 1, wherein the circuitry is further configured to allocate the bits of the encoded bit stream to the two or more resource units in one cycle and to fill all resource units with bits at the same time.

5. The first communication device as claimed in claim 1, wherein at least one ratio of the number of tones of subsections covered by a pair of resource units of the two or more resource units is a non-integer number, wherein the circuitry is further configured to allocate a remainder of bits that are not allocated to the two or more resource units as first portion of bits and/or as second portion of bits according to the first ratio either as additional bits in addition to the predetermined number of bits in the first and/or last alternation of a cycle or as pre- and/or post-bits in a pre-assignment and/or post-assignment at the start and/or end of a cycle.

6. The first communication device as claimed in claim 3, wherein the circuitry is further configured to allocate the same number of pre-bits and post-bits in the pre-assignment and the post-assignment, and/or to allocate the same number of additional bits in the first alternation, and/or the last alternation of a cycle and/or in one or more other predetermined alternations of a cycle.

7. The first communication device as claimed in claim 1, wherein a first resource unit covers a subsection having 26 tones and a second resource unit covers a subsection having 52 tones, or wherein a first resource unit covers a subsection having 26 tones and a second resource unit covers a subsection having 106 tones, or wherein a first resource unit covers a subsection having 242 tones and a second resource unit covers a subsection having 484 tones, or wherein a first resource unit covers a subsection having 242 tones and a second resource unit covers a subsection having 996 tones, or wherein a first resource unit covers a subsection having 484 tones and a second resource unit covers a subsection having 996 tones, or wherein a first resource unit covers a subsection having 242 tones, a second resource unit covers a subsection having 996 tones, and a third resource unit covers a subsection having 484 tones.

8. The first communication device as claimed in claim 1, wherein the circuitry is further configured to generate signaling information for transmission to the second communication device, the signaling information indicating which resource units are assigned to the second communication device, and/or the sizes and/or subsections of the channel bandwidth are covered by the resource units, and/or how the bits of the encoded bit stream are allocated to two or more resource units.

9. The first communication device as claimed in claim 1, wherein the circuitry is further configured to add bits to the encoded bit stream before allocating the bits to two or more resource units to achieve a predetermined length of the encoded bit stream, and/or to interleave the symbols, per resource unit, over the tones of the subsection covered by the respective subsection or to interleave the symbols, across the two or more resource units, over the tones of the subsections covered by the two or more resource units.

10. The first communication device as claimed in claim 1, wherein the predetermined number of consecutive bits is an integer multiple of the number of bits per group of bits groupwise mapped to symbols of a constellation or half the number of bits per group of bits groupwise mapped to symbols of a constellation.

11. Second communication device configured to communicate with a first communication device, the second communication device comprising:

circuitry configured to extract, from a received signal in the frequency domain, tones of different subsections of a channel bandwidth that are covered by two or more resource units assigned to the second communication device, wherein at least two of the two or more resource units cover subsections having a different number of tones;

groupwise demap, per resource unit, bits of an encoded bit stream allocated to the respective resource unit from symbols of a constellation;

retrieve from two or more resource units the bits of the encoded bit stream;

wherein a number of bits of the encoded bit stream allocated to a resource unit is proportional to the number of tones of the subsection covered by the resource unit, wherein the bits allocated to the two or more resource units in one cycle are alternately retrieved from the two or more resource units in two or more alternations, wherein, for a first portion of the bits allocated to the two or more resource units in one cycle, a first ratio of predetermined numbers of consecutive bits alternately retrieved from two resource units is based on the number of tones of subsections covered by said two resource units, and wherein, for a second portion of the bits allocated to the two or more resource units in one cycle, a second ratio of predetermined numbers of consecutive bits alternately retrieved from two resource units is different from the first ratio, wherein the second ratio is formed by a remainder of bits that are not allocated to the two or more resource units as first portion of bits according to the first ratio; and decode code words of the encoded bit stream into data words of an output bit stream.

12. The second communication device as claimed in claim 11,
wherein the circuitry is further configured to determine which resource units are assigned to the second communication device from signaling information received from the first communication device.

13. First communication method of a first communication device configured to communicate with a second communication device, the first communication method comprising:
encoding data words of an input bit stream to be transmitted to the second communication device into code words of an encoded bit stream;
allocating the bits of the encoded bit stream to two or more resource units assigned to the second communication device and covering different subsections of a channel bandwidth,
wherein at least two of the two or more resource units cover subsections having a different number of tones,
wherein a number of bits of the encoded bit stream allocated to a resource unit is proportional to the number of tones of the subsection covered by the resource unit,
wherein the bits to be allocated to the two or more resource units are alternately allocated to the two or more resource units in a cycle having two or more alternations,
wherein, for a first portion of the bits to be allocated to the two or more resource units in one cycle, a first ratio of predetermined numbers of consecutive bits alternately allocated to two resource units is based on the number of tones of subsections covered by said two resource units, and
wherein, for a second portion of the bits to be allocated to the two or more resource units in one cycle, a second ratio of predetermined numbers of consecutive bits alternately allocated to two resource units is different from the first ratio, wherein the second ratio is formed by a remainder of bits that are not allocated to the two or more resource units as first portion of bits according to the first ratio;
groupwise mapping, per resource unit, bits of the encoded bit stream allocated to the respective resource unit to symbols of a constellation; and
assigning the resource units to the respective subsection of the channel bandwidth in the frequency domain.

14. Second communication method of a second communication device configured to communicate with a first communication device, the second communication method comprising:
extracting, from a received signal in the frequency domain, tones of different subsections of a channel bandwidth that are covered by two or more resource units assigned to the second communication device, wherein at least two of the two or more resource units cover subsections having a different number of tones;
groupwise demapping, per resource unit, bits of an encoded bit stream allocated to the respective resource unit from symbols of a constellation;
retrieving from two or more resource units the bits of the encoded bit stream,
wherein a number of bits of the encoded bit stream allocated to a resource unit proportional to the number of tones of the subsection covered by the resource unit,
wherein the bits allocated to the two or more resource units in one cycle are alternately retrieved from the two or more resource units in two or more alternations,
wherein, for a first portion of the bits allocated to the two or more resource units in one cycle, a first ratio of predetermined numbers of consecutive bits alternately retrieved from two resource units is based on the number of tones of subsections covered by said two resource units, and
wherein, for a second portion of the bits allocated to the two or more resource units in one cycle, a second ratio of predetermined numbers of consecutive bits alternately retrieved from two resource units is different from the first ratio, wherein the second ratio is formed by a remainder of bits that are not allocated to the two or more resource units as first portion of bits according to the first ratio; and
decoding code words of the encoded bit stream into data words of an output bit stream.

15. A non-transitory computer-readable medium including a computer program comprising program code, which when executed by circuitry, causes the circuitry to perform the steps of said method according to claim 13.

16. A non-transitory computer-readable medium including a computer program comprising program code, which when executed by circuitry, causes the circuitry to perform the steps of said method according to claim 14.

* * * * *